United States Patent [19]

Chizhikov et al.

[11] 4,300,202

[45] Nov. 10, 1981

[54] METHOD AND APPARATUS FOR WEIGHT DETERMINATION OF THE AMOUNT OF A SUBSTANCE POSSESSING FLUIDITY QUALITY

[76] Inventors: Vladimir M. Chizhikov, Sojuzny prospekt, 26, korpus 1, kv. 75; Leonid A. Matskin, Krasnoarmeiskaya ulitsa, 26, korpus 2, kv. 23; Mikhail N. Fokin, 5 Parkovaya ulitsa, 52, kv. 146; Boris P. Timofeev, Gospitalny val, 3, korpus 4, kv. 35; Mark N. Tokar, Varshavskoe shosse, 55, korpus 4, kv. 325; Ruben D. Balayan, Perovskaya ulitsa, 13, korpus 1, kv. 69; German A. Trubin, B.Semenovskaya ulitsa, 27/2, kv. 59; Alexandr M. Melik-Shakhnazarov, Leninsky prospekt, 67/2, kv. 303, all of Moscow; Dmitry A. Barabashov, Novomytischinsky prospekt, 39, korpus 2, kv. 161, Mytischi Moskovskoi oblasti; Vladimir A. Dmitriev, Leninsky prospekt, 67/2, kv. 281; Sergei V. Vakhlyaev, Teply stan, 6 mikroraion, korpus 91, kv. 157, both of Moscow, all of U.S.S.R.

[21] Appl. No.: 85,291

[22] Filed: Oct. 16, 1979

[51] Int. Cl.³ .......................................... G01G 13/16
[52] U.S. Cl. ..................................... 364/567; 177/59; 222/52
[58] Field of Search .................. 364/567; 177/59, 111, 177/114; 141/83, 196; 222/52, 77

[56] References Cited

U.S. PATENT DOCUMENTS

| | | | |
|---|---|---|---|
| 3,260,320 | 7/1966 | Clamp | 364/567 X |
| 3,268,020 | 8/1966 | Puechberty | 364/567 X |
| 3,690,392 | 9/1972 | Smith | 177/59 |
| 3,692,212 | 9/1972 | Irie et al. | 222/52 X |
| 3,734,215 | 5/1973 | Smith | 177/59 |
| 3,855,458 | 12/1974 | Motter et al. | 364/510 |
| 4,013,194 | 3/1977 | Moscraini | 222/23 |
| 4,023,021 | 5/1977 | Kuschel | 364/567 |
| 4,206,506 | 6/1980 | Ludahl et al. | 222/77 X |

FOREIGN PATENT DOCUMENTS 1414753 11/1975 United Kingdom .
113019 7/1957 U.S.S.R. .
476454 11/1975 U.S.S.R. .

*Primary Examiner*—Edward J. Wise
*Attorney, Agent, or Firm*—Fleit & Jacobson

[57] ABSTRACT

A method of weight determination of the amount of a substance possessing fluidity quality, carried out in a continuous flow of the substance, which method comprises the steps as follows: periodically loading a number of reservoirs with the substance being fed therein continuously until a preset upper range is reached which is determined by at least one of the characteristics including the volume and weight of the substance and load time; weighing each of the reservoirs for the preset upper range after a time interval corresponding to the setup time for the reservoir with the substance; unloading each of the reservoirs to obtain the preset lower range and weighing each of the reservoirs for the preset lower range after a time interval corresponding to the setup time for the reservoir with the substance; unloading each of the reservoirs in coincidence with loading one of the remaining reservoirs and with unloading at least one of the remaining reservoirs; and determining the total amount of the substance using the weighing results relating to the reservoirs with the substance for the preset upper and lower ranges. An apparatus to carry out the method of the invention comprises a number of reservoirs, and device for feeding the substance into the reservoirs and a device for withdrawing the substance from the reservoirs, all of which devices are associated with respective reservoirs. Designed to communicate with said devices and with a control unit are reservoir loading and unloading devices. The reservoirs suspend from dynamometric pickups, which are rigidly attached to a body and coupled to frequency converters. There are devices for indicating the amount of the substance led into the reservoirs, said devices having contactless signalling elements for the preset upper range and being connected to the control unit. There are devices for indicating the amount of the substance withdrawn from the reservoirs, which devices having contactless signalling units for the preset lower range and being connected to the control unit. The apparatus of the invention comprises a unit to measure and register the amount of the substance, the latter unit being connected to the control unit.

15 Claims, 17 Drawing Figures

METHOD AND APPARATUS FOR WEIGHT DETERMINATION OF THE AMOUNT OF A SUBSTANCE POSSESSING FLUIDITY QUALITY

FIELD OF THE INVENTION

The present invention relates to methods and apparatuses for weight determination of the amount of a substance, and more particularly to methods and apparatuses for weight determination of the amount of a substance possessing a fluidity quality, carried out in a continuous flow of the substance.

The invention is applicable to petrol, chemical and food industries, as well as to petroleum products supply, for precise quantitative metering of liquid products, including receiving, pumping and dispensing operations performed at a given production rate.

DESCRIPTION OF THE PRIOR ART

At present, quantitative metering of liquid products is effected in terms of volume, mass and weight. The methods and apparatuses effecting quantitative metering of liquid products on the basis of direct or indirect measurements in terms of volume units are inferior to those dealing with mass or weight units, as volume-type measurements depend on the parameters of the surrounding medium. In the case of mass-type measurements carried out for pumped or run-off/run-in liquids, the mass value is determined by processing intermediate measurement results. The associated methods and apparatuses are expensive and complex ones and ensure an accuracy which is dependent on the errors resulted from all the measurement results used.

Known in the art is a method of weight determination of the amount of freely running product (cf. U.S. Pat. No. 3,690,392, Int.Cl. G01g 13/16, Sept. 12, 1972), whereby the product under metering is maintained in the form of a continuous flow introduced periodically into each of the respective receiving tanks until a preset level of the product is obtained in the given tank. According to a signal from a respective level indicator, the delivery of the product to the given tank is stopped and the flow of the product is directed into another tank, while the tank filled with the product is weighed. After weighing, this tank is unloaded and the weight of the emptied tank, given a negative sign, is then determined. Thereafter, the amount of the substance withdrawn from the tank is determined and also the total amount of the substance passed through the tanks at the given point in time is determined. The moment when the loading of one of the tanks is terminated coincides with the beginning of loading another tank and the above-mentioned sequence of operations is then repeated.

The method allows for weighing a freely flowing product which is continuously introduced into the receiving tanks.

In the method, however, the determination of the amount of a freely flowing substance is characterized by a considerable error. This is caused by the dynamic component of the weight which results from an oscillatory movement of the tanks during the supply and withdrawal of the substance. In addition, the operations of the method do not provide for a condition in which the unloading of a given tank is brought into coincidence with the unloading of the other. As a result, it is impossible to have a continuous out flow of the substance and to maintain at the same time the outlet pipe lines completely filled with the substance. This in turn results in greater error in determining the weight amount of the substance in the product lines, which are therefore operated abnormally.

Known in the art is an apparatus to effect the above method (cf. U.S. Pat. No. 3,690,392, Int.Cl. G01g 13/16, Sept. 12, 1972), comprising a number of receiving tanks for the substance under measurement and reservoir loading and unloading means connected with each of the tanks. In the apparatus, two receiving tanks are connected with the support structures by means of a number of bolt-type rods. The rods are arranged symmetrically along the circumference of the tanks at two levels. There are dynamometric pickups equal in number to the receiving tanks, resting on load receiving devices and affixed to the body. The pickups operate to convert the tanks weight loads to electric signals.

The reservoir loading and unloading means comprise the devices for unloading the weighed substance and the device which redistributes the flow of the substance delivered to the tanks. The unloading device comprises a clamp grab of the lower hole of the receiving tank, provided with a hydraulic drive. The device is mounted directly on the tank. The weighed substance to be unloaded is moved by means of a belt-type transporter installed under the tanks.

The redistributing device comprises a flap valve with a hydraulic drive, a hopper with two holes to receive the substance, each of said holes being located above its respective tank. The device is mounted directly on the support structures of the apparatus.

The reservoir loading and unloading means and the dynamometric pickups are coupled to a control unit. The latter comprises a timing motor whose shaft is connected with a cam mechanism actuating a number of contact groups, and also a relay electrically connected to the supply circuit of the timing motor and to the contact groups of the cam mechanism.

The known apparatus also comprises means to indicate the amount of the substance passed into the tanks, which are coupled to the control unit and are operated to acknowledge that a given volume of the substance in the tanks is reached. The indication means are contact-type level pickups which operate to indicate the moment when the flow of the substance is to be redistributed from one tank to another and the moment when the tank filled with the substance is to be weighed.

The known apparatus also comprises a unit to measure and register the amount of the substance, said unit being provided with an analog-digital converter (a digital voltmeter) coupled to the control unit, and a digital printer coupled to the analog-digital converter.

The measuring/registering unit makes it possible to weigh the tanks and record the weighing result in digital form.

The outputs of the dynamometric pickups fed from separate d.c. power supplies are coupled at the given points in time to the inputs of the digital voltmeter.

The control unit is used to control the emptied and filled tanks according to a certain program, which is formed by timing program switches, and to control the operation of the substance loading and unloading means and the digital printer as well. When actuated by a signal acknowledging that the filled tank is weighed, available from the indication means, the relay enables the supply circuit to be connected to the windings of the timing motor for the entire cycle including the weighing of the filled tank, the unloading of it, and the weighing of the emptied tank. The cam mechanism connected with the shaft of the timing motor and with multiple contact groups works out control signals of a given time sequence to perform the above-mentioned operations.

The apparatus therefore allows for the weighing of the substance passed through it and for the recording of the weighing results in digital form by means of the digital printer.

The dynamic component of the load accepted by the dynamometric pickups, which is developed by the tanks in the course of their loading and unloading, tends to increase the error related to quantitative weight determination. On the other hand, with the error maintained in appreciable limits, a delay is required before the weighing of the tanks commences, which reduces the production rate of the apparatus.

As the apparatus has two receiving tanks and two indication means, and moreover has no means to control the unloading of the tanks after weighing, it is impossible to provide for a continuous outflow of the substance or for a continuous flow of the substance both at the inlet and outlet of the apparatus. As a result, the apparatus cannot be used for weight determination of the amount of the substance in product lines.

The arrangement of the shut-off fittings and their drives directly on the tanks may result in greater inaccuracy of the weighing results relating to the amount of the substance passed through the apparatus.

The construction of the known apparatus does not allow for quantitative weight determination of the amount of easily evaporating liquids.

As the strain-type dynamometric pickups produce signals converted by the digital voltmeter, it is impossible to arrange the pickups some distance away from the secondary equipment due to the fact that the associated pilot line connecting the latter to the pickups is a source of considerable errors influencing the weighing results.

Moreover, the substance is measured with a minimal counting unit having not less than a single-stage capacity of the receiving tank, which imposes limitations on possible uses of the apparatus, such as use in batching operations.

SUMMARY OF THE INVENTION

An object of the invention is to provide a method and apparatus for weight determination of the amount of the substance possessing fluidity quality, whereby greater accuracy of the determination is attained and a continuous flow of the substance can be maintained.

There is provided a method of weight determination of the amount of the substance possessing fluidity quality, carried out in a continuous flow of the substance, comprising the steps of: periodically loading a number of reservoirs with the substance being fed continuously; weighing each of the loaded reservoirs; unloading each of the reservoirs at a moment when one of the remaining reservoirs is being loaded; weighing each of the unloaded reservoirs and determining the total amount of the substance using the weighing results. The method also comprises, according to the invention, the steps of: establishing an upper and a lower range corresponding, respectively, to the termination of the loading and unloading of the reservoirs, said upper and lower ranges being determined by at least one of the characteristics, including the volume and weight of the substance and respective loading and unloading times; weighing each of the loaded reservoirs, with the preset upper range, after a time interval corresponding to the setup time for respective reservoir with the substance; weighing each of the unloaded reservoirs, with the preset lower range, after a time interval corresponding to the setup time for respective reservoir with the substance; determining the total amount of the substance using the weighing results related to the reservoirs with the substance, with the upper and lower ranges preset; and unloading the reservoirs in such a manner that the moment when the unloading of any one of the reservoirs is terminated coincides with the time of unloading of at least one of the remaining reservoirs.

It is advantageous, in accordance with the present invention, that the substance possessing fluidity quality be a liquid which is subject to damping in each of the reservoirs in order to reduce the influence of the dynamic components of the substance flow on the results relating to weight determination of the amount of the substance, so as to increase the production rate of the metering process and to retain the desirable accuracy.

It is preferable that, in the method according to the invention, the operations concerned with the loading and unloading of the reservoirs, with the damping of the liquid, and the operations with the weighing of the reservoirs filled with the liquid be accompanied by a compensation of the hydrostatic components of the weight of the liquid.

There is also provided an apparatus to effect the method of weight determination of the amount of a substance possessing fluidity quality, carried out in a continuous flow of the substance, the apparatus comprising a number of reservoirs, reservoir loading means and reservoir unloading means which are coupled with each of the reservoirs, dynamometric pickups equal in number to the reservoirs, which are affixed to a body, the reservoirs being suspended from their respective pickups, a control unit coupled to the substance loading and unloading means, means connected to the control unit for indicating the amount of the substance fed to reservoirs, coupled to the control unit and a unit to measure and register the amount of the substance. In the apparatus, according to the present invention, the means to indicate the amount of the substance fed to the reservoirs are provided with signalling means for the preset upper range, with means to feed the substance into the reservoirs, and with means to withdraw the substance from the reservoirs, equal in number to the reservoirs, said feed and withdrawal means being adapted to establish communication between the reservoirs and the reservoir loading and unloading means. The means to indicate the amount of the substance withdrawn from the reservoirs are equal in number to the reservoirs and have respective signalling means for the preset lower range and respective frequency converters, equal in number to the reservoirs and coupled to respective dynamometric pickups. The substance metering and registering unit including networks for arithmetic processing the measured data and determining the weight of the reservoirs with the substance, and also determining the weighing results relating to the loaded and unloaded reservoirs, said arithmetic processing networks being equal in number to the reservoirs and having their respective data inputs coupled to respective frequency converters, and having their respective two measurement trigger inputs and their respective reset inputs coupled to corresponding outputs of the control unit, and having their respective two control outputs coupled to corresponding inputs of the control unit. A summation unit has one input coupled to an output of the control unit, which is coupled to the reset inputs of the arithmetic processing networks, and having its other inputs, equal in number to the reservoirs, coupled to data outputs of the arithmetic processing networks. A time-mark generator has its outputs, equal in number to the reservoirs, coupled to respective time-mark inputs of the arithmetic processing networks.

It is advantageous that the substance feeding and withdrawal means be implemented as bellows installed out of their respective reservoirs on end face members thereof in order to standardize the components of the apparatus and simplify its construction.

It is preferable that each of the reservoirs be made as a hermetically sealed unit and have externally located, on its upper end face member and in a coaxial relation to the bellows, an additional bellows to pass the volatile components of the liquid, the first and second bellows having identical cross-sections, in order to eliminate the loss of the volatile components of the liquid and to decrease the influence of pressure changes in the hermetically sealed reservoirs on the weighing results.

It is advantageous that each of the reservoirs, according to the invention, be provided with additional means to damp the liquid resting on the surface of the latter.

It is preferable that the damping means comprise a plate having an area less than the cross-section of the respective reservoir and be provided with an off-center hole and a guide member which is positioned in a vertical fixed relation to the end face members of a respective reservoir and in said off-center hole of the plate in order to increase the effectiveness of the damping means.

It is advantageous that a rod member be in a vertical position along the axis of symmetry of each respective reservoir, said rod member being adapted to compensate for the hydrostatic components of the weight of the liquid, and having its length exceeding the distance between the extreme limits of the preset upper and lower ranges for loading and unloading, respectively, the rod member having, along its entire length, a cross-section equal to that of the first and second bellows, and also having its end affixed to the body in order to provide for a possibility of calibration and certification of the apparatus with the aid of reference masses (weights).

It is preferable that each of the arithmetic processing networks comprise: a subtract binary counter, a group of AND gates, equal in number to the number of bit positions of the subtract binary counter and coupled to corresponding outputs thereof; an add binary counter having its set inputs coupled to outputs of each of the AND gates; an overflow acknowledgement circuit having its input coupled to an inverse output of the high-order position of the add binary counter; a controllable switch, some of whose inputs are used, respectively, as a data input of the arithmetic processing network, measurement trigger input of the arithmetic processing network, reset inputs of the arithmetic processing network, and a time-mark input of the arithmetic processing network, and some of whose outputs are used, respectively, as control outputs of the arithmetic processing network, and a data output of the network, the switch being coupled by another input to the output of the overflow acknowledgement circuit, and being coupled by its other outputs, respectively, to the counting input of the sub tract binary counter, to the second inputs of each AND gate, and to reset inputs of the sub tract and add binary counters; and a second add binary counter having its counting and reset inputs coupled to respective outputs of the controllable switch, and having its inverse outputs of low- and high-order positions coupled to corresponding inputs of the controllable switch.

The apparatus carrying out the techniques according to the method of the invention are inexpensive, have simple design features, and are compatible to the basic production processes for product transport, utilizing conventional means for volume determination of the amount of the product handled, with the result that high accuracy and validity of the results obtained during the determination of the amount of the product by weight measuring means are attained.

DESCRIPTION OF THE DRAWINGS

The invention will now be described in more detail, by way of example, with reference to the accompanying drawings in which.

DESCRIPTION OF THE INVENTION

The proposed method of weight determination of the amount of a substance possessing fluidity quality, carried out in a continuous flow of the substance, utilizes a preliminary distribution of a continuous flow of the substance by introducing the latter into a number of reservoirs, so that a continuous flow of the substance is then maintained and is withdrawn from the reservoirs, and the weighing results are then used for weight determination of the amount of the substance being handled.

Figure 1:
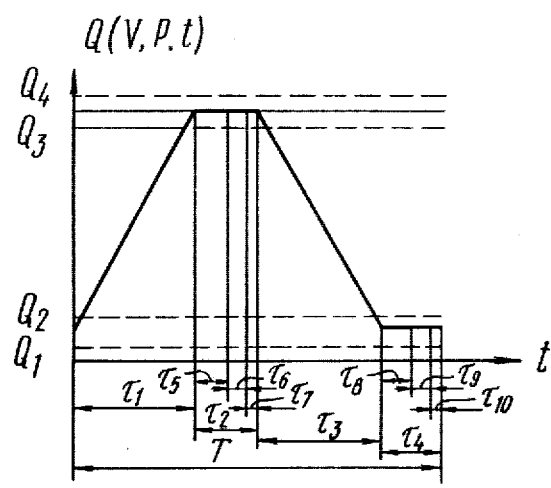
FIG. 1 is a timing diagram illustrating a variation of the amount of the substance during the operational cycle for each reservoir of an apparatus for weight determination of the amount of the substance possessing fluidity quality, according to the invention.

For each reservoir employed, provision is made for an operational cycle arranged in a given sequence according to FIG. 1. The sequence of operations applies to time interval T for a single operation cycle and to a variation of amount Q of the substance in the reservoir during time interval T. The substance is fed continuously into the reservoir for time interval $\tau_1$. The loading is terminated within a preset upper range. The latter is determined in accordance with amount Q of the substance fed into the reservoir and with the characteristics of the flow of said substance. The preset upper range is determined by the characteristics which are functionally related to amount Q of the substance passed into the reservoir in the form of a continuous flow. Such characteristics involve the substance volume, the substance weight and the substance load time. The upper limit of the preset upper range, $Q_4$, is determined by the value of the characteristic, corresponding to the capacity of the reservoir loaded. The lower limit of the preset upper range, $Q_3$, is determined by the value of the characteristic, corresponding to the end of loading the reservoir. The preset upper range, including the limits from $Q_3$ to $Q_4$, is characteristic of the end of reservoir loading, which makes it possible to take into account the possible variations of the characteristics of the substance flow and a transport delay related to the end of the load operation. In addition, the preset upper range allows for the use of the reservoir capacity to a maximal extent, in which case the overflow condition is eliminated when a continuous flow of the substance is introduced into the reservoir. During time interval $\tau_2$, the weighing result for the preset upper range is obtained. The time interval $\tau_2$ includes time interval $\tau_5$ which is characteristic of a setup time of the substance-loaded reservoir within the preset upper range, said setup time being a measure of damping the reservoir after loading is terminated. In addition, time interval $\tau_2$ includes time interval $\tau_6$ which is characteristic of the time of weighing the reservoir within the preset upper range after the setup time has elapsed. Finally, time interval $\tau_2$ includes time interval $\tau_7$ which is characteristic of the time required for remembering the weighing results in the preset upper range after the weighing is terminated. Time interval $\tau_5$ provides for better accuracy of the weighing results for the preset upper range, as the dynamic error due to the reservoir loading is eliminated. After time interval $\tau_2$ has elapsed, the reservoir unloading commences. Within time interval $\tau_3$, the reservoir is unloaded. In this case, a continuous flow of the substance is maintained and the unload operation is terminated within the preset lower range. The latter is determined by the amount of substance withdrawn from the reservoir and equal to the amount of the substance previously introduced therein, depending on the reservoir capacity and on the characteristics of the formed flow of the substance withdrawn. The preset lower range is determined by the characteristics which are functionally related to amount Q of the substance withdrawn from the reservoir in the form of a continuous flow. Such characteristics are the volume and weight of the substance withdrawn and unload time. The upper limit of the preset lower range, $Q_2$, is determined by the value of the characteristic, corresponding to the end of the unload operation. The lower limit of the preset lower range, $Q_1$, is determined by the value of the characteristic, corresponding to the emptied reservoir. The preset lower range within limits $Q_1$ to $Q_2$ is characteristic of the end of reservoir unloading, which makes it possible to take into account the possible variations of the characteristics of the substance flow and a transport delay of the unload operation and provides for the equality of the amounts of the substance loaded and unloaded within time interval T. Within time interval $\tau_4$, the weighing results for the preset lower range are obtained and the difference between the weighing results relating, respectively, to the reservoirs with the substance for the upper and lower ranges is determined. Time interval $\tau_4$ includes time interval $\tau_8$ which is characteristic of a setup time of the unloaded reservoir for the preset lower range, said setup range being a measure of damping the reservoir after unloading is terminated. In addition, time interval $\tau_4$ includes time interval $\tau_9$ which is characteristic of the time of weighing the unloaded reservoir within the preset lower range after the setup time has elapsed. Finally, time interval $\tau_4$ includes time interval $\tau_{10}$ which is characteristic of the time required for noting and remembering the weighing result for the preset lower range and determining the difference between the weighing results relating, respectively, to the reservoirs with the substance for the upper and lower ranges. The difference so obtained corresponds to the weight amount of the substance withdrawn from the reservoir. Time interval $\tau_8$ provides for better accuracy of the weighing results for the preset lower range as the dynamic error due to the reservoir unloading is eliminated. After time interval $\tau_4$ has elapsed, the loading of the reservoir which belongs to the next operational cycle within the given sequence of operations commences.

The employment of the upper and lower ranges for each reservoir being handled makes it possible to separate in time the beginning and end of the load and unload operations, as the operations concerned with the weighing results are conducted within said ranges. Since the setup time is taken into account, the influence of the dynamic components of the flow of the substance being led to and from the reservoirs is eliminated. According to the method of the invention, the parameters of the weight measuring means employed are related to the capacity and weight of the reservoirs. The selected capacity of a reservoir should ensure that the weight of the loaded reservoir, within the preset upper range, is less than or equal to a maximum permissible load of the employed weight measuring means, while the weight of the unloaded reservoir, within the preset lower range, is greater than a minimum permissible load of the used weight measuring means.

To carry out the method of the invention, use is made of a number of identical reservoirs having similar functional capabilities, in which the mentioned-above cycle of repeated operations is effected. The time it takes to conduct an operation in a reservoir is the same for all the reservoirs used, the number of the reservoirs being determined by the relationships between time intervals $\tau_1$, $\tau_2$, $\tau_3$, $\tau_4$. The cycle including the repeated operations and relating to a given reservoir is time-shifted relative to the cycle of such operations for another reservoir. This means that, for the entire number of the reservoirs employed and within equal time intervals, the amount of the substance introduced into the reservoirs is equal to the amount of the substance withdrawn from them. In this case, with the inlet and outlet flows passing continuously, the conditions of time succession and cyclicity are satisfied. In loading, the condition of time succession provides for a continuous flow of the substance and is satisfied in such a manner that for the preset upper range the end of loading a reservoir corresponds to the beginning of loading the following reservoir for the preset lower range. Also in loading, the condition of time cyclicity provides for the use of a certain number of reservoirs in such a manner that the beginning of the loading of a reservoir considered to be a first one among the certain number of the reservoirs, provided that the above-mentioned condition of time succession is satisfied, corresponds to the end of the loading of the last one of the reservoirs. In unloading, the condition of time succession provides for a continuous flow of the substance and is satisfied in such a manner that for the preset lower range the end of unloading a reservoir corresponds to the beginning of unloading the following reservoir, which commences within the preset upper range. Also in unloading, the condition of time cyclicity provides for the use of a certain number of reservoirs in such a manner that the end of unloading a reservoir considering to be a last one among the certain number of reservoirs coincides in time, provided the condition of time succession in unloading is satisfied, with unloading another reservoir, which is considered to be a first one among the reservoirs.

Figure 2:
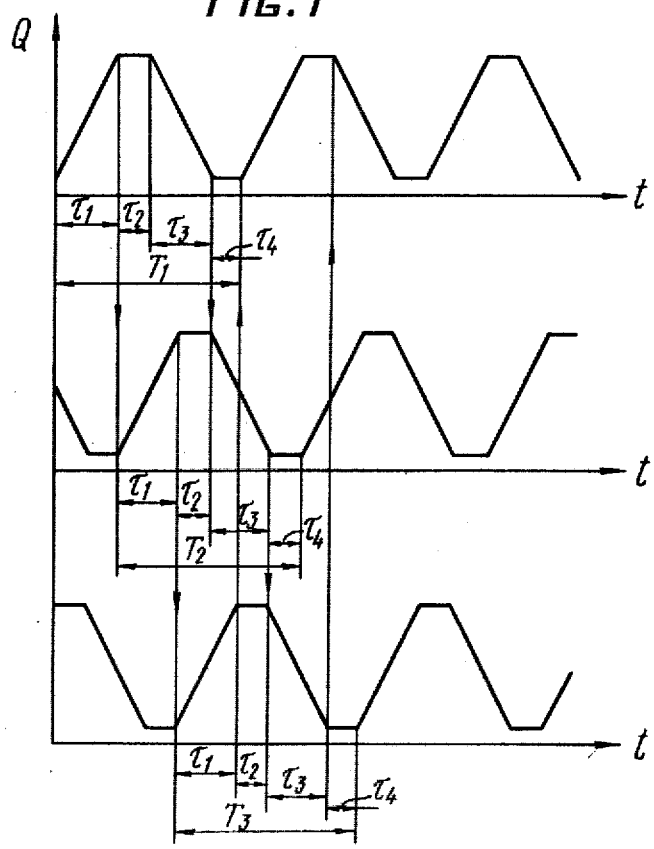
FIG. 2 is a timing diagram illustrating a variation of the amount of the substance during the operational cycle for three reservoirs, according to the invention.

FIG. 2 is a timing diagram illustrating a variation of the amount of the substance during the operation cycle for a number of identical reservoirs of similar functional capabilities, the number of the reservoirs being determined by the relationship between time intervals $\tau_1$, $\tau_2$, $\tau_3$, $\tau_4$. In the described modification, reservoir load time interval $\tau_1$ is equal to reservoir unload time interval $\tau_3$, while time interval $\tau_2$ within which the weighing result for the preset upper range is obtained is equal to time interval $\tau_4$ within which the weighing result for the preset lower range is obtained. Each of time intervals $\tau_2$, $\tau_4$ is two times each of time intervals $\tau_1$, $\tau_3$. Using the given relationship between time intervals $\tau_1$, $\tau_2$, $\tau_3$, $\tau_4$, the method of the invention is realized on the basis of three reservoirs. Time $T_1$ is needed for the cycle of successive operations for the reservoir 1, while time $\tau_2$ determines the cycle of successive operations for the reservoir 2, and time $\tau_3$ determines the cycle of successive operations for the reservoir 3. For the reservoirs 1, 2, 3 used, cycle times $T_1$, $T_2$, $T_3$ are equal to one another and are shifted so that the reservoirs 1,2,3 are loaded and unloaded in a continuous way. The point in time at which load time interval $\tau_1$ for the reservoir 1 has expired coincides with the beginning of load time interval $\tau_1$ for the reservoir 2. The end of load time interval $\tau_1$ for the reservoir 2 coincides with the beginning of load time interval $\tau_1$ for the reservoir 3. The end of load time interval $\tau_1$ for the reservoir 3 coincides with the beginning of load time interval $\tau_1$ for the reservoir 1. The coincidence of the end of load time interval $\tau_1$ for one reservoir with the beginning of load time interval $\tau_1$ for another reservoir is valid for all of the reservoirs 1,2,3 with the result that they can be loaded with a continuous flow of the substance. On the other hand, the end of unload time interval $\tau_3$ for the reservoir 1 coincides with the beginning of unload time interval $\tau_3$ for the reservoir 2. The end of unload time interval $\tau_3$ for the reservoir 2 coincides with the beginning of unload time interval $\tau_3$ for the reservoir 3. The end of unload time interval $\tau_3$ for the reservoir 3 coincides with the beginning of unload time interval $\tau_3$ for the reservoir 3. The coincidence of the end of unload time interval $\tau_3$ for one reservoir with the beginning of unload time interval $\tau_3$ for another reservoir is valid for all of the reservoirs 1,2,3 with the result that they can be unloaded continuously.

Time intervals $\tau_2$, $\tau_4$ for each reservoir make it possible to separate in time and determine the beginning of the operations concerned with loading and unloading the reservoirs.

According to the method of the invention, the total amount of the substance, introduced into the reservoirs, for equal time intervals, is equal to the total amount of the substance withdrawn from the reservoirs.

The method of the invention has various modifications. It can be carried out at different relationships between time intervals $\tau_1$, $\tau_2$, $\tau_3$, $\tau_4$. To select proper time intervals $\tau_1$, $\tau_2$, $\tau_3$, $\tau_4$, a number of reservoirs can be used. In a particular case concerned with weight determination of the amount of a substance possessing fluidity quality, two reservoirs can be used for weight determination of the amount of a substance handled in unloading in the form of a continuous flow. In this case, unload time interval $\tau_3$ for each reservoir is equal to the sum of load time interval $\tau_1$ and time intervals $\tau_2$, $\tau_4$, namely, $$\tau_3 = \tau_1 + \tau_2 + \tau_4.$$

According to the method of the invention, the dynamic components of the substance flow are eliminated by introducing setup time intervals for the reservoirs with the substance.

If a substance possessing fluidity quality is a liquid, decreasing the dynamic components of the liquid flow is attained by damping the liquid in each of the reservoirs. Damping the liquid in this case means that the free surface of the liquid in the reservoir is damped. The volume of the liquid can be used as a damper, provided the liquid runs in and out of the reservoir from under its surface at the level of the preset lower range.

When the liquid runs in and out of the reservoirs from under its surface and weighing is performed, a hydrostatic weight component is available which introduces an error in the weighing results. The error is determined by the characteristics representative of the condition of the liquid in static state. These characteristics are density and pressure. During loading, unloading and weighing the reservoirs with the liquid, the hydrostatic weight component exists for the entire distance between the preset upper and lower ranges. To eliminate the error, an additional weight component is introduced which is equal in value and of the opposite direction with respect to that weight component, which results from loading and unloading the reservoirs when the liquid runs in and out from under its surface. The additional weight component is used to compensate for the weight component resulting from loading and unloading the reservoirs in the above-described manner over the entire distance between the preset upper and lower ranges and from weighing the reservoirs with the liquid. The compensation of the two weight components of the same value and opposite direction is effected by means of the liquid whose characteristics correspond to its static state.

The apparatus to carry out the method of weight determination of the amount of a substance possessing fluidity quality in the form of a continuous flow comprises three reservoirs 1,2,3 (FIG. 3) which suspend from dynamometric pickups 4,5,6, respectively. The pickups are mounted on a body 7. The apparatus also comprises substance reservoir loading means 8,9,10 and reservoir unloading means 11,12,13 which are coupled, respectively, with inlet and outlet collectors 14,15 and are implemented in the form of a shut-off fitting with an electromagnetic drive. The apparatus comprises means 16,17,18 to feed the substance into the reservoirs and means 19,20,21 to withdraw the substance from the reservoirs. The means 16,17,18 are implemented as branch pipes affixed to the reservoir loading means 8,9,10, respectively. The means 19,20,21 are implemented as a flexible tube which couples the reservoirs 1,2,3 with respective reservoir unloading means 11,12,13. The reservoirs 1,2,3 are provided with respective upper range signalling means (URSM) 22,23,24 to indicate that the level of the substance is within a preset upper range 25, and with lower range signalling means (LRSM) 26,27,28 to indicate that the level of the substance is within a preset lower range 29. The preset upper range 25 corresponds to the end of loading each of the reservoirs 1,2,3 while the preset lower range 29 corresponds to the end of unloading each of the reservoirs 1,2,3. Each of the signalling means 22,23,24,25,26,27,28 of the upper and lower ranges has its input coupled to a common chassis bus 30 of the apparatus. There are frequency converters 31,32,33 coupled to respective dynamometric pickups 4,5,6. Each of the frequency converters 31,32,33 has its input coupled to the common chassis bus 30 of the apparatus. A control unit 34 has its inputs 35,36,37 coupled, respectively, to the outputs of the signalling means 22,23,24 of the upper range, and also has its inputs 38,39,40 coupled to the outputs of the signalling means 26,27,28 of the lower range. The control unit 34 has its outputs 41,42,43 coupled, respectively, to the inputs of the electromagnets of the reservoir loading means 8,9,10, and also has its outputs 44,45,46 coupled, respectively, to the inputs of the electromagnets of the reservoir unloading means 11,12,13. The apparatus also comprises a unit 47 to measure and register the amount of the substance, which unit includes three networks 48,49,50 for arithmetic processing of the measured data and determining the weight of the reservoirs 1,2,3 with the substance and the weighing results relating to the loaded and unloaded reservoirs 1,2,3, a time-mark generator 51, and a summation unit 52. The units 34,48,49,50,51,52 have their respective inputs coupled to the common bus 30. The arithmetic processing networks 48,49,50 have their inputs 53,54,55 coupled to respective outputs of the frequency converters 31,32,33. Outputs 56,57 of the arithmetic processing network 48, outputs 58,59 of the arithmetic processing network 49, and outputs 60, 61 of the arithmetic processing network 50 are coupled, in pairs, to respective inputs of the control unit 34. Inputs 62,63 of the arithmetic processing network 48, inputs 64,65 of the arithmetic processing network 49, and inputs 66,67 of the arithmetic processing network 50 are coupled, in pairs, to respective outputs of the control unit 34. Inputs 68 of the networks 48,49,50 are joined together and coupled to a respective output of the control unit 34.

Outputs 69,70,71 of the networks 48,49,50, respectively, are coupled to corresponding inputs of the summation unit 52. The remaining input of the summation unit 52 is coupled to the inputs 68 of the networks 48,49,50. Inputs 72,73,74 of the networks 48,49,50 are coupled to respective outputs of the time-mark generator 51. A supply unit 75 has an output coupled to the common bus 30. An output 76 of said unit 75 is coupled to respective inputs of the frequency converters 31,32,33, whereas an output 77 is coupled to the inputs of the electromagnets (not shown) of the reservoir loading means 8,9,10 and reservoir unloading means 11,12,13. An output 78 of said unit 75 is coupled to respective inputs of the control unit 34, networks 48,49,50 of the time-mark generator 51, and summation unit 52.

Figure 4:
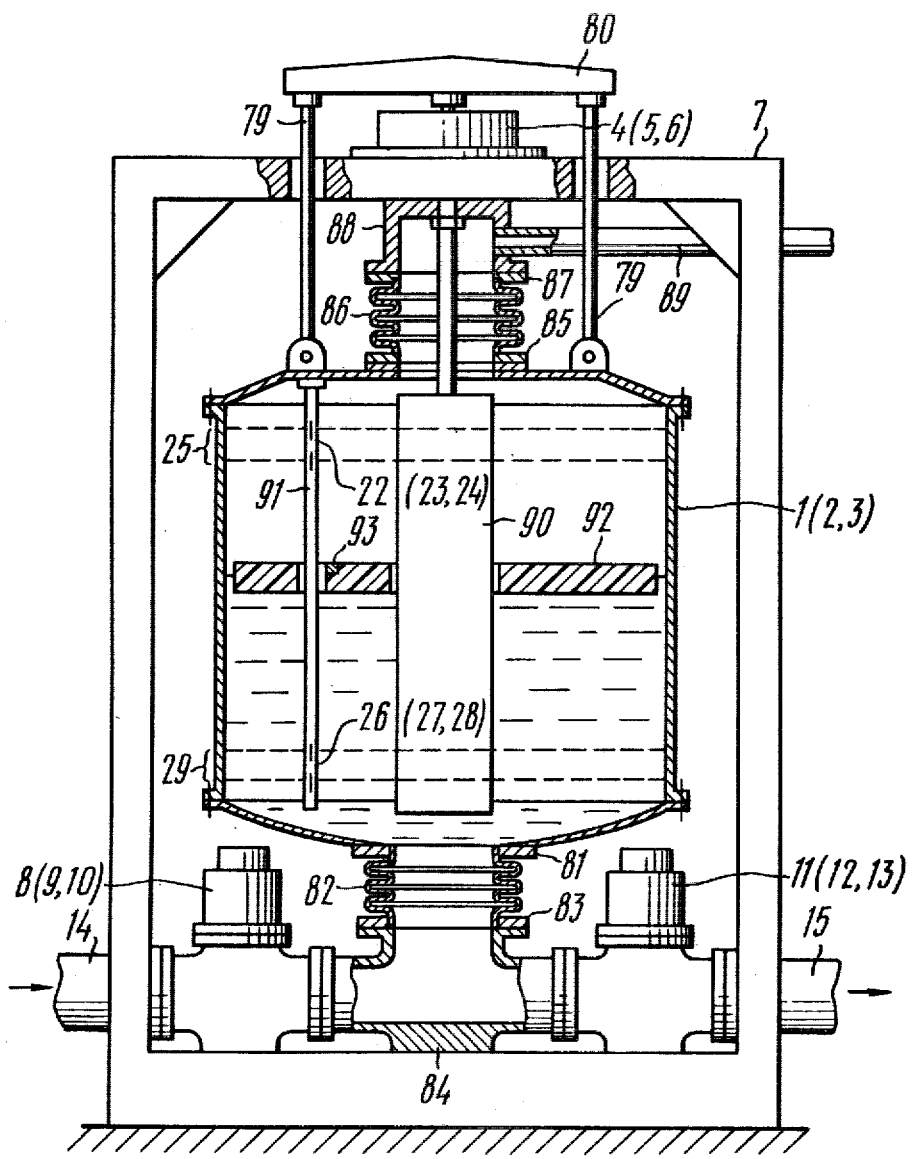
FIG. 4 is a construction of a reservoir with dynamometric pickups and reservoir loading and unloading means, front view, partially sectioned, according to the invention.

The reservoirs 1,2,3 are affixed with rods 79 (FIG. 4) to suspensions 80 resting on respective dynamometric pickups 4,5,6, which are mounted on top of the body 7.

To provide for simpler construction and increased accuracy of weighing the reservoirs 1,2,3 with the substance, bellows 82 are attached with flange 81 to external end face members of the reservoirs and have their lower portions fixed to T-pieces 84 with flanges 83. The bellows 82 serve concurrently as the substance feeding means 16,17,18 and the substance withdrawal means 19,20,21.

The reservoir loading means 8,9,10 are connected with the reservoir unloading means 11,12,13 by means of the T-pieces 84 secured on the lower part of the body 7. The reservoir loading means 8,9,10 are connected with the inlet collector 14, while the reservoir unloading means are connected with the outlet collector 15.

To avoid the loss of volatile components of the substance, which could otherwise contaminate the surroundings, the reservoirs 1,2,3 are made hermetically sealed. For this purpose, bellows 86 are fixed to their upper end face portions and have their upper portions connected with a flange 87 to chambers 88, which are rigidly mounted on top of the body 7. The bellows 86 are installed in coaxial relation to the bellows 82, the cross-sections of the bellows 86,82 being equal to each other. Branch pipes 89 coupled with the chamber 88 are used to pass the volatile components of the substance, which are led into them from the reservoirs 1,2,3 via the bellows 86.

To reduce the error of weighing the reservoirs 1,2,3 with the liquid, in case they are loaded and unloaded from under the liquid surface, rods 90 are located within the reservoirs along their axes of symmetry to compensate for the hydrostatic components of the weight of the liquid, said rods 90 being rigidly mounted on the chambers 88. The rods 90 have their lengths exceeding the distance between the upper limit of the preset upper range 25 and the lower limit of the preset lower range 29. The rods 90 have their upper end faces positioned above the upper limit of the preset upper range 25. The bellows 82,86 and the rod 90 are arranged in a coaxial relation and have equal cross-sections, which are uniform through their entire lengths.

Affixed with their ends to the interior of the upper end face members of the reservoirs 1,2,3 are tubes 91 of magnetically permeable material. The tubes 91 accomodate the signalling means 22,23,24 for the preset upper range and the signalling means 26,27,28 for the preset lower range. The signalling means 22,23,24,25,26,27,28 are hermetically sealed magnet-controlled contact subassemblies.

To decrease the dynamic components of the load on the dynamometric pickups 4,5,6 occurred during loading and unloading the reservoirs 1,2,3 and to increase the production rate of the apparatus with the accuracy of weighing maintained at higher level, liquid damping means are adapted to rest on the liquid surface within the reservoirs 1,2,3, which means are floats in the form of plates 92, each having two holes for the rods 90 and tubes 91, the diameters of these holes being greater than the diameters of the rods 90 and tubes 91. Mounted on the plates 92, close to the holes for the tubes 91 are magnets 93 which interact with the signalling means 22,23,24 and the signalling means 26,27,28.

To describe the arithmetic processing networks 48,49,50 (FIG. 5), the network 48 is taken as an example. The latter comprises a subtract binary counter 94 having its outputs coupled, in a bit-by-bit manner, to respective inputs of two-input AND gates 95. The outputs of the AND gates 95 are coupled, in a bit-by-bit manner, to set inputs of an add binary counter 96. The number of the bit positions of the add binary counter 96 and the subtract binary counter 94 as well as the number of the AND gates 95 of each of the networks 48,49,50 is determined by the requirement to be met by the accuracy of determining the weight of the reservoirs 1,2,3 with the substance. The complement output of the high-order position of the add binary counter 96 is coupled to the input of an overflow acknowledgment circuit 97. Each of the networks 48,49,50 comprises a controllable switch 98 whose output 99 is coupled to a counting input of the subtract binary counter 94. The controllable switch 98 has an output 100 coupled to the second inputs of the AND gates 95, has an output 101 coupled to a counting input of the add binary counter 96, has an output 102 coupled to reset inputs of the bit positions of the subtract binary counter 94, of the add binary counter 96, and of an add binary counter 103, has an output 104 coupled to a counting input of the add binary counter 103, has an input 105 coupled to the output of the overflow acknowledgement circuit 97, and also has outputs 106,107 coupled to the complement outputs of the low- and high-order positions of the add binary counter 103. An input of the controllable switch 98 of the network 48 is used as an input 53 of that network. A second input of the controllable switch 98 of the network 48 is used as an input 62 of the network 48. A third input of the controllable switch 98 of the network 48 is an input 63 of the network 48. A fourth input of the controllable switch 98 of the network 48 is an input 68 of the network 48. A fifth input of the controllable switch 98 of the network 48 is an input 72 of the network. An output of the controllable switch 98 of the network 48 is an output 56 of the network. A second output of the controllable switch 98 of the network 48 is an output 57 of the network. A third output of the controllable switch 98 of the network 48 is an output 69 of the network. An input of the controllable switch 98 of the network 49 is an input 54 of the network. A second input of the controllable switch 98 of the network 49 is an input 64 of the network. A third input of the controllable switch 49 is an input 65 of the network. A fourth input of the controllable switch 49 is an input 68 of the network. A fifth input of the controllable switch 98 of the network 49 is an input 73 of the network. An output of the controllable switch 98 of the network 49 is an output 58 of the network. A second output of the controllable switch 98 of the network 49 is an output 59 of the network. A third output of the controllable switch 98 of the network 49 is an output 70 of the network. An input of the controllable switch 98 of the network 50 is an input 55 of the network. A second input of the controllable switch 98 of the network 50 is an input 66 of the network. A third input of the controllable switch 98 of the network 50 is an input 67 of the network. A fourth input of the controllable switch 98 of the network 50 is an input 68 of the network. A fifth input of the controllable switch 98 of the network 50 is an input 74 of the network 50. An output of the controllable switch 98 of the network 50 is an output 60 of the network 50. A second output of the controllable switch 98 of the network 50 is an output 61 of the network 50. A third output of the controllable switch 98 of the network 50 is an output 71 of the network.

Every controllable switch 98 comprises flip-flops (FIF) 108,109,110,111,112,113 (FIG. 6), two-input AND-NOT gates 114,115,116,117, two-input OR gates 118,119,120,121,122,123,124, three-input AND-NOT gates 125,126, two inverters 127,128, and an overflow acknowledgement circuit 129.

The set input of the flip-flop 109 is an input 106 of the controllable switch 98. An input of the AND-NOT gate 114 is, respectively, input 53,54,55 (FIG. 3) of the networks 48,49,50.

The input of the overflow acknowledgement circuit 129 (FIG. 6) is an input 107 of the controllable switch 98. An input of the OR gate 118, coupled to an input of the OR gate 120 is, respectively, the input 62,64,66 (FIG. 3) of the networks 48,49,50. Another input of the OR gate 118 (FIG. 6), coupled to the set input of the flip-flop 111 and to an input of the OR gate 123, is, respectively, the input 63, 65,67 (FIG. 3) of the networks 48,49,50. An input of the OR gate 119 (FIG. 6), coupled to an input of the OR gates 120,121,122,123, to the output of the inverter 127, and to the output of the overflow acknowledgement circuit 129, is the input 68 (FIG. 3) of the networks 48,49,50. An input of the AND-NOT gate 117 (FIG. 6), coupled to respective inputs of AND-NOT gates 125,126 is respectively, the input 72,73,74 (FIG. 3) of the networks 48,49,50. An input of the AND gate 122 (FIG. 6), coupled to the set input of the flip-flop 112, is the input 105 of the controllable switch 98. The output of the AND-NOT gate 114 is the output 104 of the controllable switch 98. The output of the AND-NOT gate 125 is the output 99 of the controllable switch 98. The output of the inverter 128 is the output 100 of the controllable switch 98. The output of the OR gate 124 is the output 101 of the controllable switch 98. The output of the OR gate 122, coupled to the reset inputs of the flip-flops 110,111, is the output 102 of the controllable switch 98. The true output of the flip-flop 113 is, respectively, the output 56,58,60 (FIG. 3) of the networks 48,49,50. The output of the AND-NOT gate 117 (FIG. 6), coupled to an input of the OR gate 124 is, respectively, the output 69,70,71 (FIG. 3) of the networks 48,49,50.

The true output of the flip-flop 112 (FIG. 6) of the controllable switch 98 of the network 48 is the output 57 (FIG. 3) of the network. The complement outputs of the flip-flop 112 of the controllable switches 98 of the networks 49,50 are, respectively, the outputs 59,61 of the networks. The set input of the flip-flop 108 (FIG. 6) is coupled to the output of the OR gate 118, while the reset input of the flip-flop 108 is coupled to the output of the OR gate 119. The true output of the flip-flop 108 is coupled to an input of the AND-NOT gate 114. An input of the OR gate 119, coupled to the input of the inverter 127 and to an input of the OR gate 121, is connected to the output of the overflow acknowledgement circuit 129. The output of the OR gate 120 is coupled to the reset input of the flip-flop 112. The output of the OR gate 121 is coupled to the reset input of the flip-flop 109. The true output of the flip-flop 109 is coupled to respective inputs of the AND-NOT gates 125,126. The output of the inverter 127 is coupled to respective inputs of the AND-NOT gates 115,116. The output of the AND-NOT gate 115 is coupled to the set input of the flip-flop 110. The true output of the flip-flop 110 is coupled to an input of the AND-NOT gate 117. The true output of the flip-flop 111 is coupled to an input of the AND-NOT gate 115 and to an input of the AND-NOT gate 126. The true output of the flip-flop 111 is coupled to an input of the AND-NOT gate 116 and to an input of the AND-NOT gate 125. The output of the AND-NOT gate 116 is coupled to the input of the inverter 128 and to the set input of the flip-flop 113. The reset input of the flip-flop 113 is coupled to the output of the OR gate 123. The output of the AND-NOT gate 126 is coupled to an input of the OR gate 124.

To describe the overflow acknowledgement circuits 97 (FIG. 5) and the overflow acknowledgment circuit 129 (FIG. 6), the circuit 97 is taken as an example. The latter comprises an inverter 130 (FIG. 7), whose output is coupled to an input AND-NOT gate 131, a diode 132 having its cathode coupled to another input of the AND-NOT gate 131 and used as the output of the circuit 97. The circuit 97 also comprises a capacitor 133 having one lead coupled to the common bus 30 and having another lead coupled to the input of the inverter 130, which is coupled to the anode of the diode 132 and to a lead of a resistor 134. The other lead of the resistor 134 is coupled to a logic 1 potential. The output of the AND-NOT gate 131 is the output of the overflow acknowledgement circuit 97.

The control unit 34 comprises load control units 135,136,137 (FIG. 8) to control loading the reservoirs 1,2,3, respectively, an unload control unit 138 to control unloading the reservoir 1, unload control units 139,140 to control unloading the reservoirs 2,3, signal formers 141,142,143 to produce signals acknowledging that the substance level exceeds the preset upper range, signal formers 144,145,146 to produce signals acknowledging that the substance level exceeds the preset lower range, signal formers 147,148,149 to produce trigger signals for triggering the networks 48,49,50, and beginning-of-measurement (BOM) delay circuits 150,151,152. An input 153 of the load control unit 135 is coupled to the output of a two-input AND-NOT gate 154. An input 155 of the load control unit 135 is coupled to an input of two-input OR gate 156, to an input of a three-input OR gate 157, to an output 158 of the load control unit 137, to inputs 159,160 of the signal formers 142,143, to an input 161 of the signal former 149, said input 155 being used as the input 37 of the control unit 34. An input 162 of the load control unit 135 is coupled to the output 57 (FIG. 3) of the network 48. An input 163 (FIG. 8) of the load control unit 135 is coupled to an input of the AND-NOT gate 154, to the input of an inverter 164, to an input of a four-input OR gate 165, to an input 166 of the load control unit 136, to inputs 167,168 of respective signal formers 141,143, to an input 169 of the signal former 147, said input 163 being used as the input 35 of the control unit 34. An input 164 of the load control unit is coupled to inputs 171,172 of the load control units 136,137, to inputs 173,174,175 of the unload control units 138,139,140, to inputs 176,177,178 of the signal formers 147,148,149, and to the true output of a flip-flop 179. An input 180 of the unload control unit 138 is coupled to the output of a three-input AND-NOT gate 181. An input 182 of the unload control unit 138 is coupled to an output of a three-input of the AND-NOT gate 183. An input 184 of the unload control unit 138 is coupled to respective inputs of the AND-NOT gates 180,183, to an input of the OR gate 165, to inputs 185,186 of the signal formers 144,146, to the input of the inverter 187, to an input 188 of the signal former 147, said input 184 being used as the input 38 of the control unit 34. An output 189 of the load control unit 135 is used as the output 41 of the control unit 34. An output 190 of the unload control unit 138 is the output 44 of the control unit 34. An output 191 of the unload control unit 138 is coupled to an input of a two-input AND-NOT gate 192. An output 193 of the unload control unit 138 is coupled to an input 194 of the load control unit 135. An input 195 of the load control unit 136 is coupled to an input of the OR gate 165 and to the output of the AND-NOT gate 196. An input 197 of the load control unit 136 is coupled to the output of a two-input NOR gate 198. An input 199 of the load control unit 136 is coupled to an input 200 of the load control unit 137, to an input of a three-input OR gate 201, to inputs 202,203 of the signal formers 141,142, to an input 204 of the signal former 148, said input 199 being used as the input 36 of the control unit 34. An input 205 of the unload control unit 139 is coupled to the output of the inverter 187. An input 206 of the unload control unit 139 is coupled to the output 58 (FIG. 3) of the network 49. An input 207 (FIG. 8) of the unload control unit 139 is coupled to an input of a three-input OR gate 201, to the input of an inverter 208, to inputs 209,210 of the signal formers 144,145, to an input 211 of the signal former 148, said input 207 being used as the input 39 of the control unit 34. An output 212 of the load control unit 136 is the output 42 of the control unit 34. An output 213 of the unload control unit 139 is the output 45 of the control unit 34. An output 214 of the unload control unit 139 is coupled to an input of a two-input AND-NOT gate 215. An output 216 of the unload control unit 139 is coupled to an input 217 of the load control unit 136. An input 218 of the load control unit 137 is coupled to a lead of a resistor 219, to an input of a two-input AND-NOT gate 220, and to a logic 1 potential. An input 221 of the load control unit 137 is coupled to the output of a two-input NOR gate 222. An input 223 of the unload control unit 140 is coupled to the output of the inverter 208. An input 224 of the unload control unit 140 is coupled to the output 60 (FIG. 3) of the network 50. An input 225 (FIG. 8) of the unload control unit 140 is coupled to the input of an inverter 226, to inputs 227, 228 of the signal formers 145,146, to an input 229 of the signal former 149, to an input of the OR gate 157, said input 225 being used as the input 40 of the control unit 34. An output 230 of the load control unit 137 is the output 43 of the control unit 34. An output 231 of the unload control unit 140 is the output 46 of the control unit 34. An output 232 of the unload control unit 140 is coupled to an input of a two-input AND-NOT gate 233. An output 234 of the unload control unit is coupled to an input 235 of the load control unit 137. An input 236 of the signal former 141 is coupled to inputs 237,238,239,240,241 of corresponding signal formers 142,143,144,145,146, to the output of a two-input OR gate 242, and to the inputs 68 (FIG. 3) of the networks 48,49,50. An input of a three-input AND-NOT gate 181 (FIG. 8), coupled to an input of a three-input AND-NOT gate 183, is coupled to the output 56 (FIG. 3) of the network 48. An input of a two-input NOR gate 198 (FIG. 8), to the output 59 (FIG. 3) of the network 49. An input of a two-input NOR gate 222 (FIG. 8) is coupled to the output 61 (FIG. 3) of the network 50. An input 243 (FIG. 8) of the delay circuit 150 is coupled to the output of a four-input OR gate 165. An output 244 of the delay circuit 150 is coupled to an input 245 of the signal former 147 of the network 48. Ouputs 246, 247 of the signal former 147 of the network 48 are coupled, respectively, to the inputs 62,63 (FIG. 3) of that network. An input 248 (FIG. 8) of the delay circuit 151 is coupled to the output of a three-input OR gate 201. An output 249 of the delay circuit 151 is coupled to an input 250 of the signal former 148. Outputs 251, 252 of the signal former 148 are coupled, respectively, to the inputs 64, 65 (FIG. 3) of that network. An output 249 of the delay circuit 151 is coupled to an input 250 of the signal former 148. Outputs 251, 252 of the signal former 148 are coupled, respectively to the inputs 64, 65 (FIG. 3) of the network 49. An input 253 (FIG. 8) of the delay circuit 152 is coupled to the output of a three-input OR gate 157. An output 254 of the delay circuit 152 is coupled to an input 255 of the signal former 149. Outputs 256, 257 of the signal former 149 are coupled, respectively, to the inputs 66, 67 (FIG. 3) of the network 50. Outputs 258, 259, 260 (FIG. 8) of the signal formers 141, 142, 143 are coupled to respective inputs of a three-input OR gate 261 whose output is coupled to an input of a four-input OR gate 262. Outputs 263, 264, 265 of the signal formers 144, 145, 146 are coupled to respective inputs of a three-input OR gate 266 whose output is coupled to an input of a four-input OR gate 262. The set input of the flip-flop 179 is coupled to the set input of a flip-flop 267, to the input of an inverter 268, to an input of the OR gate 242, and to a lead of a "Start" button 269 of the apparatus, which has another lead coupled to a respective lead of a "Stop" button 270 of the apparatus and to the common bus 30. Another lead of the "Stop" button 270 is coupled to an input of the OR gate 262 whose output is coupled to the reset input of the flip-flop 179. An input of the OR gate 262 is coupled to respective inputs of the OR gates 156,242 and to the output of the AND-NOT gate 220. An input of the AND-NOT gate 220 is coupled to the output of an inverter 271 whose input is coupled to respective leads of resistors 219,272 and to a lead of a capacitor 272. The other leads of the resistor 272 and the capacitor 273 are coupled to the common bus 30. The complement output of the flip-flop 179 is coupled to respective inputs of the AND-NOT gates 192,215,233. An input of the OR gate 165 is coupled to the output of the AND-NOT gate 192. An input of the OR gate 201 is coupled to the output of the AND-NOT gate 215. An input of the OR gate 157 is coupled to the output of the AND-NOT gate 233. An input of the AND-NOT gate 181 is coupled to the true output of the flip-flop 267. An input of the AND-NOT gate 183 is coupled to the output of the inverter 226. An input of the OR gate 198, coupled to an input of the NOR gate 222, is connected to the complement output of the flip-flop 267 whose reset input is coupled to the output of the OR gate 156. An input of the AND-NOT gate 154, coupled to an input of the AND-NOT gate 196, is connected to the output of the inverter 268. The other input of the AND-NOT gate 196 is coupled to the output of the inverter 164.

Figure 9:
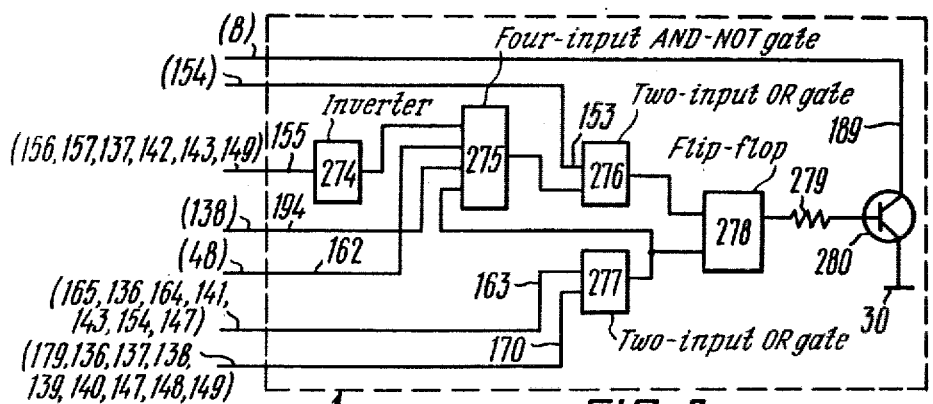
FIG. 9 is a block diagram of a load control unit of the control unit, according to the invention.

To describe the load control units 135,136,137 (FIG. 9) for respective reservoirs 1,2,3, consider the unit 135. The latter comprises an inverter 274 whose output is coupled to an input of a four-input AND-NOT gate 275. An input of a two-input OR gate 276 is coupled to the output of the four-input AND-NOT gate 275, while the output of the OR gate 276 is coupled to the set input of a flip-flop 278. The output of a two-input OR gate 277 is coupled to the reset input of the flip-flop 278 and to an input of the AND-NOT gate 275. A resistor 279 has a lead coupled to the true output of the flip-flop 278 and has another lead coupled to the base lead of a transistor 280 whose emitter lead is coupled to the common bus 30. Respective inputs of two-input OR gates 276 of the units 135, 136,137 are the inputs 153,195,218 of these units. The inputs of the inverters 274 of the units 135,136,137 are, respectively, the inputs 155,166,200 of these units. Corresponding inputs of the AND-NOT gates 275 of the units 135,136,137 are, respectively, the inputs 162,197,221 of these units. The other inputs of the AND-NOT gates 275 of the units 135,136,137 are, respectively, the inputs 194,217,235 of these units. Respective inputs of the OR gates 277 of the units 135,136,137 are, correspondingly, the inputs 163,199,158 of these units, while the other inputs of the OR gates 277 are, respectively, the inputs 170,171,172 of these units. The collector leads of the transistors 280 of the units 135,136,137 are, respectively, the outputs 189,212,230 of these units.

Figure 10:
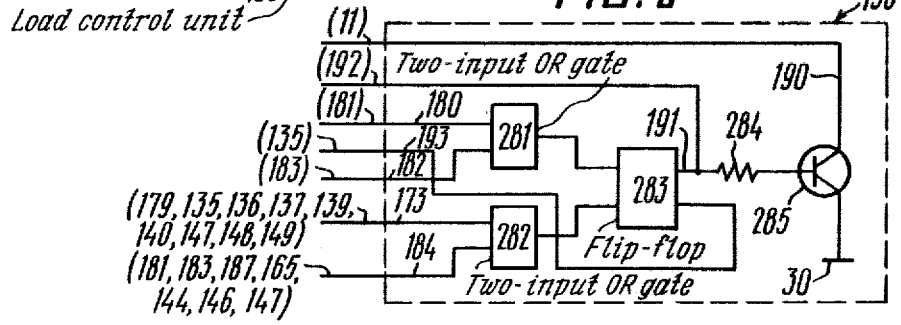
FIG. 10 is a block diagram of a first unload control unit of the control unit, according to the invention.

The unload control unit 138 for the reservoir 1 comprises two-input OR gates 281,282 (FIG. 10) whose outputs are coupled, respectively, to the set and reset inputs of a flip-flop 283. The unit 138 also comprises a resistor 284 having one lead coupled to the true output of the flip-flop 283, and having another lead coupled to the base lead of a transistor 285 whose emitter lead is coupled to the common bus 30. An input of the OR gate 281 is the input 180 of the unit 138, while the other input of the OR gate 281 is the input 182 of the unit 138. An input of the OR gate 282 of the unit 138 is the input 173 of the unit, and the other input of the OR gate 282 is the input 184 of the unit. The true output of the flip-flop 283 of the unit 138 is the output 191 of the unit, while the complement output of the flip-flop 283 is the output 193 of the unit 138. The collector lead of the transistor 285 of the unit 138 is the output 190 of that unit.

Figure 11:
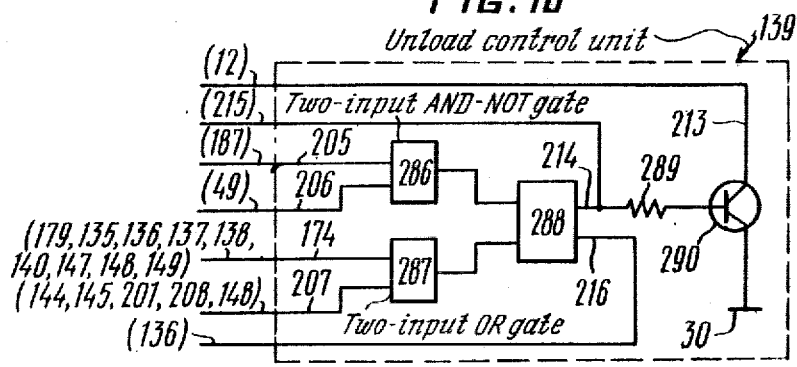
FIG. 11 is a block diagram of second and third unload control units of the control unit, according to the invention.

To describe the unload control units 139,140 (FIG. 11) for the reservoirs 2,3, respectively, the unit 139 is taken as an example. The latter comprises a two-input AND-NOT gate 286 and a two-input OR gate 287 whose outputs are coupled, respectively, to the set and reset inputs of a flip-flop 288. A resistor 289 has a lead coupled to the true output of the flip-flop 288, and has another lead coupled to the base lead of a transistor 290 whose emitter lead is coupled to the common bus 30. Corresponding inputs of the AND-NOT gates 286 of the units 139,140 are, respectively, the inputs 205, 223 of the units 139,140. The other inputs of the AND-NOT gates 286 are, respectively, the inputs 206,224 of the units 139,140. Corresponding inputs of the OR gates 287 are, respectively, the inputs 174,175 of the units 139,140. The other inputs of the AND-NOT gates 287 are, respectively, the inputs 207,225 of the units 139,140. The true outputs of the flip-flops 288 of the units 139, 140 are, respectively, the outputs 214, 232 of these units. The complement outputs of the flip-flops 288 are, respectively, the outputs 216,234 of the units 139,140. The collector leads of the transistors 290 of the units 139, 140 are, respectively, the outputs 213,231 of the units 139,140.

To describe the signal formers 147,148,149 (FIG. 12) for producing trigger pulses for the networks 48,49,50, respectively, the signal former 147 is taken as an example. The latter comprises a two-input OR gate 291 whose output is coupled to the input of the inverter 292. Corresponding inputs of two-input AND-NOT gates 293,294 are coupled to the output of an inverter 295, while the other inputs of the AND-NOT gates 293,294 are coupled, respectively, to the output of an inverter 296 and to the output of the inverter 292. The inputs of the inverters 296 of the signal formers 147,148,149 are, respectively, the inputs 169,204,161 of these signal formers. The inputs of the inverters 295 of the signal formers 147, 148,149 are, respectively, the inputs 245,250,255 of these signal formers. Corresponding inputs of the OR gates 291 of the signal formers 147,148,149 are, respectively, the inputs 176,177,178 of these signal formers, while the other inputs of the OR gates 291 are, respectively, the inputs 188,211,229 of these signal formers. The outputs of the AND-NOT gates 293 of the signal formers 147,148,149 are, respectively, the outputs 246,251,256 of the units 147,148,149, and the outputs of the AND-NOT gates 294 are, respectively, the outputs 247,252,257 of these units.

Figure 13:
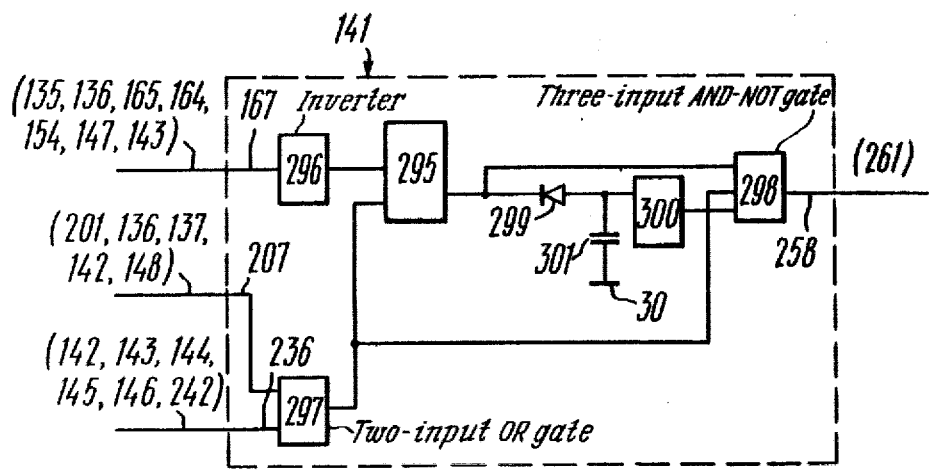
FIG. 13 is a block diagram of a signal former to form signals to acknowledge that the substance level exceeds the preset limits of the preset ranges, according to the invention.

The signal formers 141,142,143,144,145,146 (FIG. 13) for producing signals acknowledging that the substance level exceeds the prescribed limits in the reservoirs 1,2,3, respectively, are described using an example of the signal former 141. The latter comprises a flip-flop 295 whose counting input is coupled to the output of an inverter 296 whose reset input is coupled to the output of a two-input OR gate 297 and to an input of a three-input AND-NOT gate 298. The complement output of the flip-flop 295 is coupled to the cathode of a diode 299 and to an input of a three-input AND-NOT gate 298. An inverter 300 has its input coupled to the cathode of the diode 299 and to a lead of a capacitor 301, and also has its output coupled to an input of the AND-NOT gate 298. The other lead of the capacitor 301 is coupled to the common bus 30. The inputs of the inverters 296 of the signal formers 141,142,143,144,145,146 are, respectively, the inputs 167,203,160,185,210,228 of these signal formers. The OR gates 297 of the signals formers 141,142,143,144,145,146 have their corresponding inputs used as the inputs 202,159,168,209, 227,186 of these signal formers, respectively, and also have their other inputs used, respectively, as the inputs 236,237,238,239,240,241 of these signal formers. The AND-NOT gates 298 of the signal formers 141,142,143,144,145,146 have their outputs used, respectively, as the outputs 258,259,260,263,264,265 of these signal formers.

Figure 14:
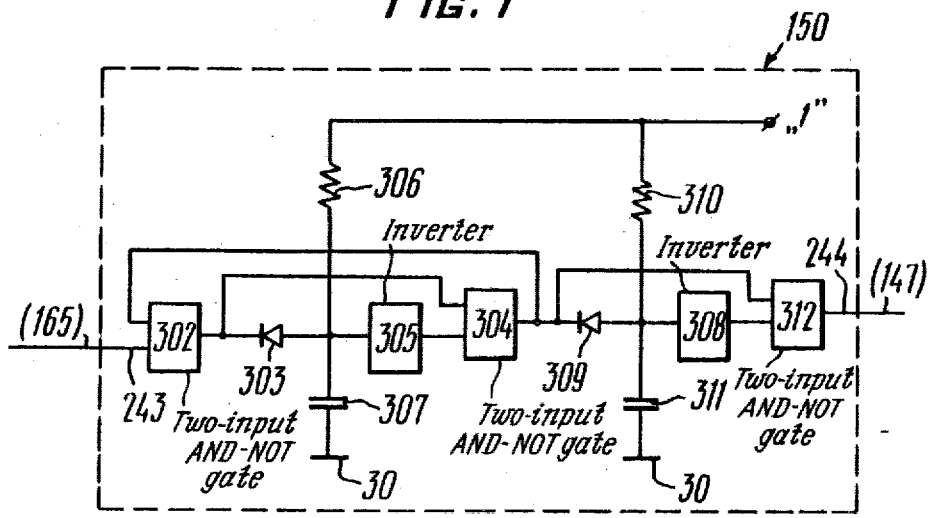
FIG. 14 is a block diagram of a time delay circuit of the control unit, according to the invention.

The delay circuits 150,151,152 (FIG. 14) are described using the circuit 150 as an example. The latter comprises a two-input AND-NOT gate 302 whose output is coupled to the cathode of a diode 303 and to an input of a two-input AND-NOT gate 304 which has another input coupled to the output of an inverter 305. The input of the inverter 305 is coupled to the anode of the diode 303 and to respective leads of a resistor 306 and a capacitor 307. The other lead of the capacitor 307 is coupled to the common bus 30, while the other lead of the resistor 306 is coupled to a logic 1 potential. The delay circuit 150 comprises an inverter 308 whose input is coupled to the anode of a diode 309 and to respective leads of a resistor 310 and a capacitor 311, and whose output is coupled to a respective input of a two-input AND-NOT gate 312 which has the other input coupled to the cathode of the diode 309, to the output of the AND-NOT gate 304, and to an input of the AND-NOT gate 302. Corresponding leads of the resistor 310 and the capacitor 311 are coupled, respectively, to a logic 1 potential and to the common bus 30. Respective inputs of the AND-NOT gates 302 of the delay circuits 150,151, 152 are, correspondingly, the inputs 243,248,253 of these circuits. The outputs of the AND-NOT gates 312 of the delay circuits 150,151,152 are, respectively, the outputs 244,249,254 of these circuits.

Figure 15:
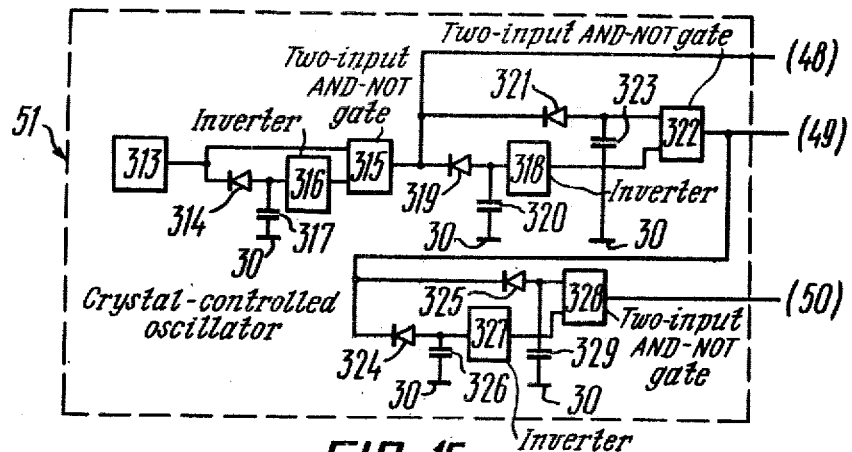
FIG. 15 is a block diagram of a time-mark generator, according to the invention.

The time-mark generator 51 (FIG. 15) of the substance measuring/registering unit 47 comprises a crystal-controlled oscillator 313 having its output coupled to the cathode of a diode 314 and to an input of a two-input AND-NOT gate 315 which has the other input coupled to the output of an inverter 316. The input of the inverter 316 is coupled to the anode of the diode 314 and to a lead of a capacitor 317 which has the other lead coupled to the common bus 30. The time-mark generator also comprises an inverter 318 whose input is coupled to the anode of a diode 319 and to a lead of a capacitor 320 which has the other lead coupled to the common bus 30. The cathode of the diode 319 is coupled to the output of the AND-NOT gate 315, to the cathode of a diode 321 and to the input 72 (FIG. 3) of the network 48. The anode of the diode 321 (FIG. 15) is coupled to an input of a two-input AND-NOT network 322 and to a lead of a capacitor 325. The other lead of the capacitor 325 is coupled to the common bus 30, while the other input of the AND-NOT gate 322 is coupled to the output of the inverter 318. The output of the AND-NOT gate 322 is coupled to the cathodes of the diodes 324,325 and to the input 73 (FIG. 3) of the network 49. The anode of the diode 324 (FIG. 15) is coupled to a lead of a capacitor 326 and to the input of the inverter 327 whose output is coupled to an input of a two-input AND-NOT gate 328. The other input of the AND-NOT gate 328 is coupled to the anode of the diode 325 and to a lead of a capacitor 329. The other leads of the capacitors 326,329 are coupled to the common bus 30. The output of the AND-NOT gate 328 is coupled to the input 74 (FIG. 3) of the network 50.

The summation unit 52 (FIG. 16) comprises an add binary-decade counter 330 having its counting input coupled to the output of a three-input OR gate 331, and also having its outputs connected, in a bit-by-bit manner, to respective inputs of a measurement results indicating circuit 332 and a measuring results registering circuit 333. The inputs of the OR gate 331 are coupled to the outputs 69,70,71 (FIG. 3) of corresponding networks 48,49,50 while the reset input of the counter 330 (FIG. 16) is coupled to the inputs 68 (FIG. 3) of the networks 48,49,50.

The apparatus of the invention operates in the following manner. When the apparatus supply unit 75 (FIG. 3) is energized, the capacitor 273 (FIG. 8), which has been discharged using the circuit of the resistor 272, begins to charge using the current whose value is determined by the rated value of the resistor 219. The value of the resistor 272 is 30 to 100 times the value of the resistor 219. In this case, logic 1 is present at the output of the inverter 271 until the capacitor 273 is given a voltage at which the inverter 271 operates. At the point in time when the capacitor 273 assumes a voltage at which the inverter 271 operates, the output of the latter produces logic 0. The output of the AND-NOT gate 220 produces a pulse whose length corresponds to the charge time of the capacitor 273 with which the operating voltage of the inverter 271 is reached. That pulse is applied, via the OR gates 262,156 to the reset inputs of the flip-flops 179,267 so that these inputs are brought to 0. At the same time, the above-mentioned pulse passes through the OR gate 242 and is applied to the inputs 236,237,238,239,240,241 of the signal formers 141,142,143,144, 145,146, to the inputs 68 of the networks 48,49,50, and to a particular input of the summation unit 52, which is coupled to the inputs 68 of the networks 48, 49, 50. Logic 0 obtainable from the true output of the flip-flop 179 (FIG. 8) at the inputs 170, 171, 172 of the load control units 135, 136, 137 brings the flip-flops 278 (FIG. 9), via the OR gates 277, to 0.

In this case, the transistors 280 of the units 135, 136, 137 are held non-conductive, the electromagnets of the reservoir loading means 8, 9, 10 (FIG. 3) are de-energized, and the means 8, 9, 10 are therefore closed.

Figure 3:
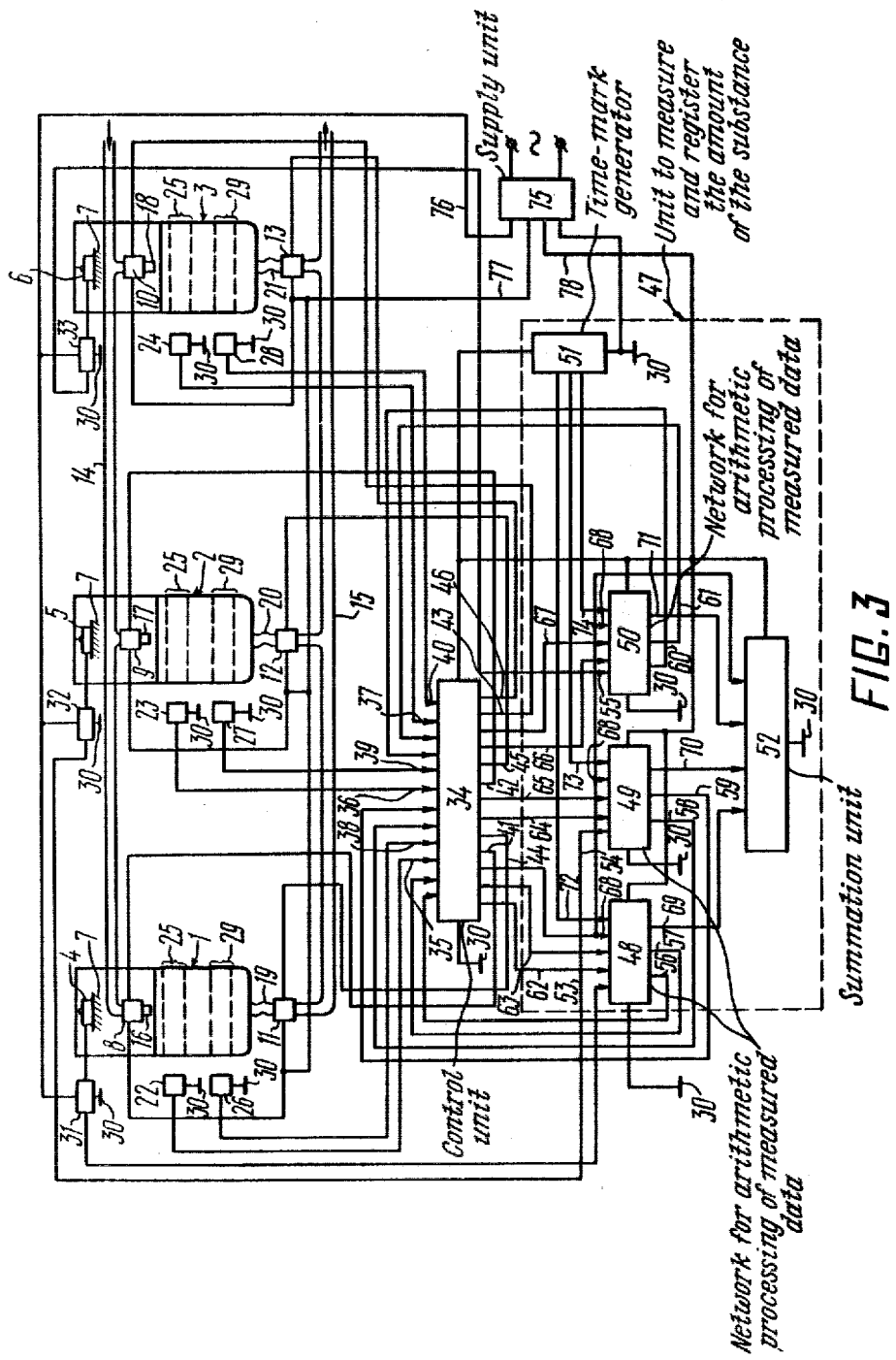
FIG. 3 is a block diagram of an apparatus for carrying out the method of the invention.

Logic 0 applied to the inputs 173, 174, 175 of the unload control units 138, 139, 140 from the true output of the flip-flop 179 (FIG. 8) brings the flip-flop 283 (FIG. 10) of the unload control unit 138 of the reservoir 1 and the flip-flops 288 (FIG. 11) of the unload control units 139, 140 of the reservoirs 2, 3 to 0. In this case, the transistor 285 (FIG. 10) of the unit 138 and the transistors 290 (FIG. 11) of the units 139, 140 are held non-conductive, the electromagnets of the reservoir unloading means 11, 12, 13 (FIG. 3) are de-energized, and the means 11, 12, 13 are therefore closed. With the above-mentioned operations performed, the apparatus automatically assumes the initial state. To activate the apparatus, it is necessary to depress the "Start" button 269 (FIG. 8) of the control unit 34. With the button 269 depressed, the flip-flops 179,267 take on the 1 state. Logic 1 is applied, from the true output of the flip-flop 179, to the inputs 170,171,172,173,174,175 of the load control units 135,136,137 and the unload control units 138,139,140, respectively. Logic 1, from the true output of the flip-flop 267, is applied to a respective input of the AND-NOT gate 181. Depressing the button 269 results in the formation, at the output of the OR gate 242, of a pulse whose length corresponds to the time within which the button 269 is held depressed. That pulse is applied to the inputs 68 (FIG. 3) of the networks 48,49,50 and to an input of the summation unit 52, coupled to the inputs 68 of the networks 48,49,50. In addition, for the time interval corresponding to the depressed condition of the button 269 (FIG. 8), logic 1 is present at the output of the inverter 268, with the result that the AND-NOT gates 196,154 are made conducting. Thereafter, the output of one of the AND-NOT gates 196, 154 produces a pulse applied to either the input 195 of the load control unit 136 or the input 153 of the load control unit 135. The appearance of that pulse at the output of one of the AND-NOT gates 196,154 depends on the substance level in the reservoir 1 (FIG. 3). With the reservoir 1 filled to the fullest extent (the substance level is positioned within the limits of the preset upper range 25), the input 35 of the control unit 34 is given logic 0 from the output of the signalling means 22. The output of the inverter 164 (FIG. 8) produces in this case logic 1 with which the AND-NOT gate 196 is made conductive while the AND-NOT gate 154 is not conducting. A trigger pulse is applied to the input 195 of the load control unit 136 of the reservoir 2. That pulse passes through the OR gate 276 (FIG. 9) of the unit 136 and is applied to the set input of the flip-flop 278 so that the latter takes up the 1 state. The transistor 280 is made conductive, with the result that the electromagnet of the reservoir loading means 9 is switched on. Thus, the latter is open and the substance begins to fill the reservoir 2. At the same time, the above-mentioned pulse is applied, from the output of the AND-NOT gate 196 (FIG. 8), to a respective input of the OR gate 165 and then to the input 243 of the delay circuit 150, with the result that the latter is activated. After a delay time, relating to the beginning of measuring the weight of the reservoir 1 (FIG. 3) filled with the substance, has elapsed, the output 244 (FIG. 8) of the delay circuit 150 produces a pulse applied to the input 245 of the signal former 147. That pulse passes via the inverter 295 (FIG. 12) and is applied to respective inputs of the AND-NOT gates 293,294. The AND-NOT gate 294 is held non-conductive using logic 0 obtainable from the output of the inverter 292.

Figure 12:
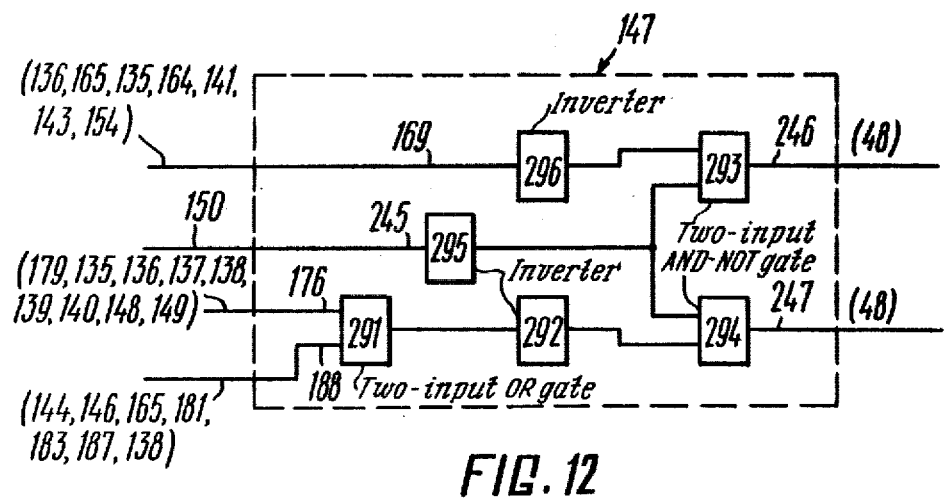
FIG. 12 is a block diagram of a signal former to form trigger pulses for the arithmetic processing network incorporated in the control unit, according to the invention.

Since logic 1's appear at the inputs 176,188 (FIG. 8) of the signal former 147, no trigger pulse can pass via the AND-NOT gate 294 (FIG. 12). The AND-NOT gate 293 is made conducting under the action of logic 1 obtainable from the output of the inverter 296. There is logic 0 at the input of the inverter 296, available from the output of the signalling means 22 (FIG. 3). As a result, the signal from the output of the inverter 295 (FIG. 12) passes through the AND-NOT gate 293 and is then applied to the input 62 (FIG. 3) of the network 48, which is activated. On completion of the cycle of measuring the weight of the reservoir 1 with the substance, the output 56 of the network 48 produces logic 1 which is applied to respective inputs of the AND-NOT gates 181,183 (FIG. 8) of the control unit 34. That logic 1 passes through the AND-NOT gate 181 and is inverted therein, so that logic 0 is applied to the input 180 of the unload control unit 138. As a result, logic 0 appears at the output of the OR gate 281 (FIG. 10), and the flip-flop 283 assumes the 1 state.

The transistor 285 is made conducting and the electromagnet of the reservoir unload means 12 (FIG. 3) is activated. Thus, the means 12 is open and the loading of the reservoir 1 commences. In most cases, however, the apparatus, when activated by depressing the button 269 (FIG. 8), operates with the reservoir 1 not filled with the substance to the fullest extent. In this case, logic 1 appears at the input 35 (FIG. 8) of the control unit 34, so that the AND-NOT gate 154 is made conducting and the AND-NOT gate 196 stops conducting. With the button 269 depressed, the apparatus trigger pulse passes through the AND-NOT gate 154 to the input 153 of the load control unit 135. That pulse passes through the OR gate 276 (FIG. 9) and the flip-flop 278 takes up the 1 state. The transistor 280 is made conducting and the electromagnet of the reservoir loading means 8 (FIG. 3) is energized to open the latter. As a result, the loading of the reservoir 1 is effected. After it is complete (the substance level is maintained between the upper and lower limits of the preset upper range 25), the signalling means 22 operates and the input 35 of the control unit 34 produces logic 0. The latter is applied to the input 163 (FIG. 8) of the load control unit 135, passes through the OR gate 277 (FIG. 9) and the flip-flop 278 takes up the 0 state. The transistor 280 is made non-conductive, the electromagnet of the reservoir loading means 8 (FIG. 3) is de-energized, and the flow of the substance to the reservoir 1 is stopped. At the same time, logic 0 from the input 35 of the control unit 34 is applied to the input 166 (FIG. 8) of the load control unit 136 and passes through the inverter 274 (FIG. 9) and the AND-NOT gate 275, so that the flip-flop 278 takes up the 1 state. The transistor 280 is made conductive and the electromagnet of the reservoir loading means 9 (FIG. 3) is energized. The means 9 is opened and the loading of the reservoir 2 commences. The same signal from the input 35 of the control unit 34 passes through the OR gate 165 (FIG. 8) to the input 243 of the delay circuit 150 and the latter is activated. After a time interval necessary for the reservoir loading means 8 (FIG. 3) to be closed and the reservoir 1 with the substance to be settled, the output 244 (FIG. 8) of the delay circuit 150 produces a pulse applied to the input 245 of the signal former 147. That pulse passes through the inverter 295 (FIG. 12) and, through the AND-NOT gate 293, is applied to the input 62 (FIG. 3) of the network 48, and the latter is thus activated. On completion of the cycle of measuring the weight of the reservoir 1 with the substance, the output 56 of the network 48 produces logic 1 which passes through the AND-NOT gate 181 (FIG. 8) and is inverted therein and is then applied to the input 180 of the unload control unit 138. Thereafter, that signal passes through the OR gate 281 (FIG. 10) to the set input of the flip-flop 283 and the latter assumes the 1 state. The transistor 285 is made conducting and the electromagnet of the reservoir unloading means 11 (FIG. 3) is energized. The means 11 is opened and the unloading of the reservoir 1 is effected. When the substance in the reservoir 2 being loaded reaches the preset upper range 25, the signalling means 23 operates and the input 38 of the control unit 34 produces logic 0. The latter is applied to input 199 (FIG. 8) of the load control unit 136, passes through the OR gate 277 (FIG. 9), and the flip-flop 278 therefore takes on the 0 state. The transistor 280 is made nonconductive and the electromagnet of the reservoir loading means 9 (FIG. 3) is de-energized. The means 9 is closed and the loading of the reservoir 2 is stopped. At the same time, logic 0 is applied, from the input 36 of the control unit 34, to the input 200 (FIG. 8) of the load control unit 137 and passes through the inverter 274 (FIG. 9) and AND-NOT gate 275 to bring the flip-flop 278 to the 1 state. The transistor 280 is made conductive and the electromagnet of the reservoir loading means 10 (FIG. 3) is energized. The means 10 is opened and the loading of the reservoir 3 is effected. The same signal from the input 36 of the control unit 34 is applied to a respective input of the OR gate 201 (FIG. 8) and then passes to the input 248 of the delay circuit 151 so that it is activated.

After a delay time necessary for the beginning of measurement has elapsed, the output 249 of the delay circuit 151 produces a pulse applied to the input 250 of the signal former 148. That pulse passes through the inverter 295 (FIG. 12) and the AND-NOT gate 293 and is applied to the input 64 (FIG. 3) of the network 49 so that the cycle of measuring the reservoir 2 with the substance commences.

On completion of the cycle of measuring the reservoir 2 with the substance, the output 58 of the network 49 produces logic 1 applied to the input 206 (FIG. 8) of the unload control unit 139. When the substance level in the reservoir 1 (FIG. 3) being unloaded reaches the preset lower range 29, the signalling means 26 operates and logic 0 appears at the input 38 of the control unit 34 and then passes to the input 184 (FIG. 8) of the unload control unit 138. Thereafter, that signal passes through the OR gate 282 (FIG. 10), brings the flip-flop 283 to the 0 state and makes the transistor 285 non-conductive. The electromagnet of the reservoir unloading means 11 (FIG. 3) is de-energized, the means 11 is closed and the flow of the substance from the reservoir 1 is stopped. That signal passes from the signalling means 26 through the inverter 187 (FIG. 8) to the input 205 of the unload control unit 139 and then passes through the AND-NOT gate 286 (FIG. 11) to the set input of the flip-flop 288 which assumes the 1 state. The transistor 290 is made conducting and the electromagnet of the reservoir unloading means 12 (FIG. 3) is switched over so that the latter is open and the unloading of the reservoir 2 is effected. At the same time, the abovementioned signal passes through the OR gate 165 (FIG. 8) to the input 243 of the delay circuit 150 with the result that the latter is activated. After a delay time for the beginning of measurement has elapsed, the output 244 of the delay circuit produces a pulse applied to the input 245 of the signal former 147. This signal passes through the inverter 295 (FIG. 12) and the AND-NOT gate 294 (with the AND-NOT gate 293 being maintained, in this case, in the non-conductive state) and is applied to the input 63 (FIG. 3) of the network 48 which is therefore activated. On completion of the cycle of measuring the weight of the reservoir 1 unloaded and determining the weight of the substance withdrawn from that reservoir, the result is registered in the summation unit 52 and logic 1 appears at the output 57 of the network 48. That signal is applied to the input 162 (FIG. 8) of the load control unit 135.

Figure 8:
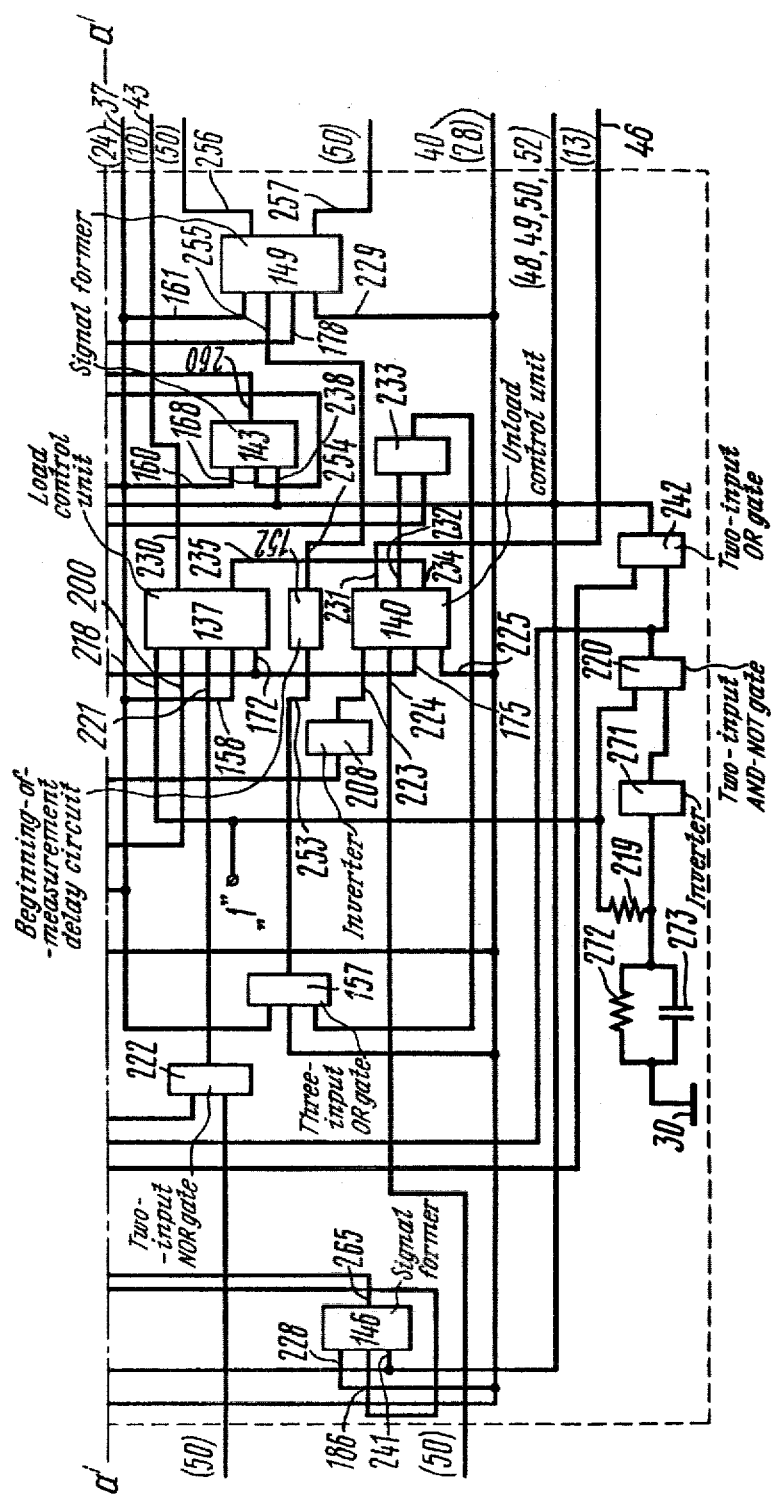
FIG. 8 is a block diagram of a control unit of the apparatus, according to the invention.
Figure 8A:
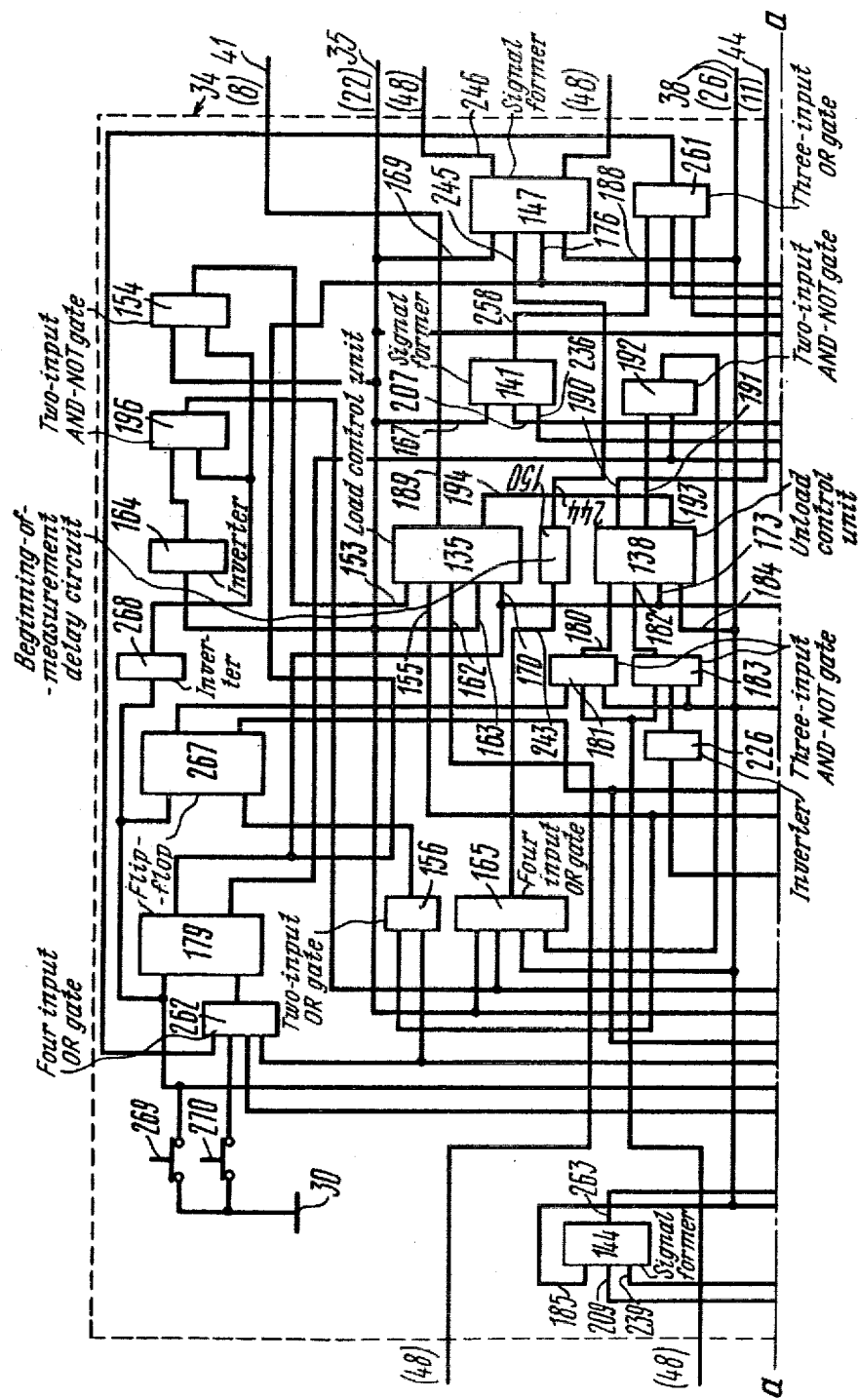
Figure 8A:
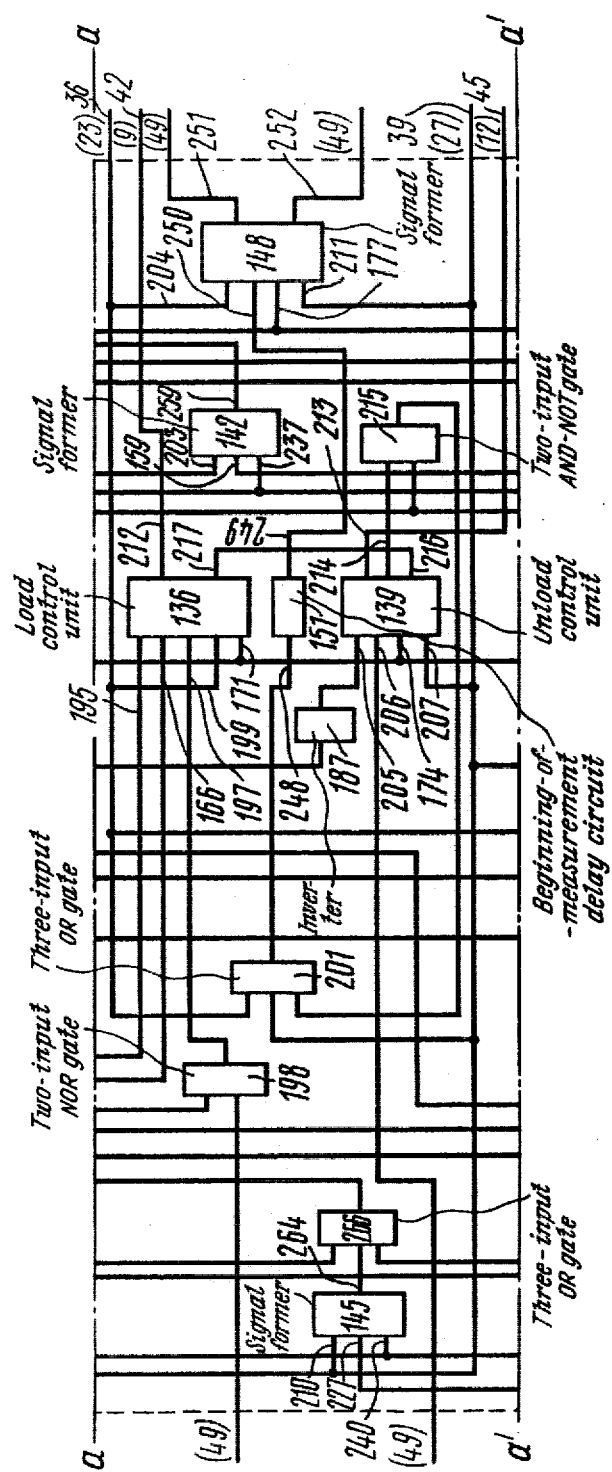

When the substance level in the reservoir 3 (FIG. 3) being loaded reaches the preset upper range 25, the signalling means 24 operates and a signal is applied to the input 37 of the control unit 34. This signal is applied to the input 158 (FIG. 8) of the load control unit 137. Thereafter, the signal passes through the OR gate 277 (FIG. 9) and brings the flip-flop 278 to the 0 state. The transistor 280 is made conducting and the electromagnet of the reservoir loading means 10 (FIG. 3) is de-energized. The means 10 is closed and the flow of the substance to the reservoir 3 is stopped. The same signal passes through the OR gate 156 (FIG. 8) and the flip-flop 267 takes up the 0 state. The AND-NOT gate 181 is made non-conductive using logic 0 from the true output of the flip-flop 267, applied to a respective input of that gate, whereas logic 0's appear at the outputs of the NOR gates 198,222, with the result that the reservoir loading means 9,10 (FIG. 3) are held closed till the moment the networks 49,50 work out respective enable signals. These enable signals are applied, from the outputs 59,61 of the networks 49,50 to respective inputs of the NOR gates 198,222 (FIG. 8) of the control unit 34. The signal from the output of the signalling means 24 (FIG. 3) is applied to the input 37 of the control unit 34 and passes to the input 155 (FIG. 8) of the load control unit 135. As stated above, the reservoir loading means 8 is opened and the flow of the substance is admitted into the reservoir 1. Moreover, the signal passes through the OR gate 157 (FIG. 8) to the input 253 of the delay circuit 152 and the latter is therefore activated. After a delay time for the beginning of measurement has elapsed, the output 254 of the delay circuit 152 produces a pulse which is applied to the input 255 of the signal former 149 and passes through the inverter 295 (FIG. 12) and the AND-NOT gate 293 and then appears at the input 66 (FIG. 3) of the network 50 so that it is activated. On completion of the cycle of measuring the weight of the reservoir 3 with the substance, the output 60 of the network 50 produces logic 1 applied to the input 224 (FIG. 8) of the unload control unit 140. After a certain time interval has elapsed, the unloading of the reservoir 2 (FIG. 3) down to the preset lower range 29 is complete. The signalling means 27 operates and the input 39 of the control unit 34 produces logic 0 which is applied to the input 207 (FIG. 8) of the unload control unit 139 and passes through the OR gate 287 (FIG. 11), with the result that the flip-flop 288 takes up the 0 state. The transistor 290 is not conducting and the electromagnet of the reservoir unloading means 12 (FIG. 3) is de-energized. The means 12 is closed and no flow of the substance is withdrawn from the reservoir 2. The same signal from the output of the signalling means 27 is applied, through the inverter 208 (FIG. 8), to the input 223 of the unload control unit 140. The signal passes through the AND-NOT gate 286 (FIG. 11), with the result that the flip-flop 288 takes on the 1 state. Thus, the electromagnet of the reservoir unloading means 13 (FIG. 3) is energized and the unloading of the reservoir 3 is effected. The same signal also passes through the OR gate 201 (FIG. 8) to the input 248 of the delay circuit 151 so that it is activated. After a time interval necessary for the reservoir unloading means 12 to be closed and the reservoir 2 with the remaining portion of the substance therein to settle, the output of the delay circuit 151 (FIG. 8) produces a signal applied to the input 250 of the signal former 148. Thereafter, the signal passes through the inverter 295 (FIG. 12) of the unit 148 and the AND-NOT gate 294 (the AND-NOT gate 148 is not conducting in this case) and is then applied to the input 65 (FIG. 3) of the network 49 so that it is activated. On completion of the cycle of measuring the weight of the unloaded reservoir 2 with the remaining portion of the substance and registering the result in the summation unit 52, the output 59 of the network 49 produces logic 0 applied to a respective input of the NOR gate 198 (FIG. 8) of the control unit 34 and then to the input 197 of the load control unit 136. The reservoir 1 is loaded in a manner that the substance reaches the preset upper range 25 before the reservoir 3 (FIG. 3) is unloaded. This is acknowledged by the signalling means 22 whose output produces a signal applied to the input 35 of the control unit 34. As stated above, this results in closure of the reservoir loading means 8, in opening of the reservoir loading means 9, and in measuring of the weight of the reservoir 1 with the substance after a time interval determined by a delay of the beginning of measurement, provided by the delay circuit 150 (FIG. 8). At the following point in time, the unloading of the reservoir 3 (FIG. 3) is terminated. The signalling means 28 operates and logic 0 appears at the input 40 of the control unit 34. That signal is applied to the input 225 (FIG. 8) of the unload control unit 140 and passes through the OR gate 287 (FIG. 11) and through the flip-flop 288 which takes on the 0 state. The transistor 290 is not conducting and the electromagnet of the reservoir unloading means 13 (FIG. 3) is de-energized so that the latter is closed and the flow of the substance from the reservoir 3 is stopped.

At the same time, that signal is applied, via the inverter 226 (FIG. 8) and the AND-NOT gate 183, to the input 182 of the unload control unit 138, so that the reservoir unloading means 11 (FIG. 3) is open and the reservoir 1 is unloaded. The same signal is applied, via the OR gate 157 (FIG. 8), to the input 253 of the delay circuit 152 which is therefore activated. After a time interval for delay of the beginning of measurement has elapsed, the output 254 of the delay circuit 152 produces a signal applied to the input 255 of the signal former 149. That signal passes through the inverter 295 (FIG. 12) and the AND-NOT gate 294 and is applied to the input 67 (FIG. 3) of the network 50 with the result that the latter is activated. On completion of the cycle of weighing the unloaded reservoir 3, determining the weight of the substance withdrawn from it, and registering the result in the summation unit, the output 61 of the network 50 produces logic 0. The latter passes through the NOR gate 222 (FIG. 8) and is applied to the input 221 of the load control unit 137. Thereafter, the apparatus performs the operations in accordance with the above sequence until the moment when the flip-flop 179 (FIG. 8) of the control unit 34 takes on logic 0. This event can occur under the following conditions: the supply unit 75 (FIG. 3) is energized; the button 270 (FIG. 8) of the control unit 34 is depressed; and a signal is available from one of the signal formers 141,142,143,144,145,146. The signals pass from the outputs 258,259,260 of the signal formers 141,142,143, via the OR gate 261, to a respective input of the OR gate 262. The signals from the outputs 263,264,265 of the signal formers 144,145,146 pass through the OR gate 266 to the reset input of the flip-flop 179.

The first case relating to the energization of the supply unit 75 (FIG. 3) has been described above.

When the button 270 (FIG. 8) of the control unit 34 is depressed, the sequence of the operations of the apparatus is as follows. The flip-flop 179 takes on the 0 state and logic 1 from its complement output is applied to respective inputs of the AND-NOT gates 192,215,233, which have their corresponding inputs coupled to the inputs 191,214,232 of the unload control units 138,139,140. Prior to depressing the button 270, logic 1 appears at the output of one of the units 138, 139,140 and logic 0 appears at the outputs of the remaining units. Under these conditions, one of the reservoirs 1,2,3 is unloaded. A short pulse is generated at the output of one of the AND-NOT circuits 192,215,233, which short pulse is applied to the input of one of the delay circuits 150,151,152 and the circuit is thus activated. Thereafter, logic 0 from the true output of the flip-flop 179 is applied to the inputs 170,171,172,173,174,175 of the load control units 135,136, 137 and the unload control units 138,139,140, respectively. This results in the closure of the reservoir loading means 8,9,10 (FIG. 3) and the reservoir unloading means 11,12,13.

After a time interval for delay of the beginning of measurement has elapsed, the output of one of the delay circuits 150,151,152 (FIG. 2), which has been activated by the pulse from one of the AND-NOT gates 192,215,233, produces a signal applied to the input of one of the signal formers 147,148,149. That signal passes through the inverter 295 (FIG. 12) and the AND-NOT gate 294 and is applied to one of the inputs 63,65,67 (FIG. 3) of their respective networks 48,49,50, with the result that a particular network is activated. On completion of the cycle of measuring the weight of the reservoir being handled for unloading at the moment when the button 270 (FIG. 8) is depressed, and of determining the weight of the unloaded reservoir with the substance, the result is registered in the summation unit 52 (FIG. 3), and the apparatus is stopped until the button 269 (FIG. 8) of the control unit 34 is depressed.

The sequence of operations in the third case as stated above will be described using the signal former 141.

With the button 269 depressed, the signal from the output of the OR gate 242 is applied to the input 236 of the signal former 141 and passes through the OR gate 297 (FIG. 13) and brings the flip-flop 295 to the 0 state. When the signal from the signalling means 22 (FIG. 3) arrives at the input 167 (FIG. 8) of the signal former 141, the output of the inverter 296 (FIG. 13) produces a positive pulse with which the flip-flop 295 is brought to the 1 state. If the substance level in the reservoir 1 (FIG. 3) continues to rise and reaches the upper limit of the preset upper range 25, the signalling means 22 operates again. The signal is applied to the input 167 (FIG. 8) of the signal former 141 and passes through the inverter 296 (FIG. 13) so as to bring the flip-flop 295 to the 0 state. In this case, logic 1 applied to the cathode of the diode 299 makes that diode non-conductive. The capacitor 301 begins to charge using the input current of the inverter 300. As the capacitor 301 charges to the operating voltage of the inverter 300, logic 1's appear at the inputs of the ANd-NOT gate 298 (one of the inputs of the gate is connected to the output of the OR gate 297 and is thus given logic 1 too), whereas the output of the AND-NOT gate 298 produces a short pulse applied, via the OR gate 261 (FIG. 8), to the reset input of the flip-flop 179 of the control unit 34. Further operation of the apparatus is the same as in the case of depressing the button 270 of the control unit 34.

Like the delay circuits 151,152, the delay circuit 150 operates in the following manner. When a trigger pulse is applied to the input 243 of the delay circuit 150, the univibrator of that circuit, built around the AND-NOT gates 302,304 (FIG. 14), inverter 305, capacitor 307, resistor 306, and diode 303, takes on the 0 state. Obtainable from the output of the AND-NOT gate 304, logic 0 is applied to the cathode of the diode 309 of the delay circuit 150 and makes the latter conducting. The capacitor 311 discharges via the diode 309. When the voltage across the capacitor 307 reaches the operating value for the inverter 305, the output of the AND-NOT gate 304 takes on the 1 state. Logic 1 brings the diode 309 to the non-conductive state and the capacitor 311 beings to charge via the resistor 310 until its voltage reaches the operating value for the inverter 308. The output of the AND-NOT gate 312, which is the output of the delay circuit 150, produces a short pulse whose length is equal to the charge time of the capacitor 311 within which it is given a voltage equal to the operating one of the inverter 308. The time interval between the moment of triggering the delay circuit 150 and the moment when the pulse is formed at its output 244 is the delay time for the beginning of measuring the reservoir, which delay time is determined by the charge time of the capacitor 307 within which the voltage across it reaches the operating voltage for the inverter 305.

The arithmetic processing networks 48,49,50 (FIG. 3) provide the means for converting data on the weight of the reservoirs 1,2,3 with the substance, available from the frequency converters 31,32,33 in the form of rectangular pulses, into a unitary code proportional to the difference between the weights of the loaded and unloaded reservoirs 1,2,3. The unitary codes obtainable from the data outputs 69,70,71 of the networks 48,49,50 are summed up and, if necessary, are registered in the summation unit 52.

Figure 5:
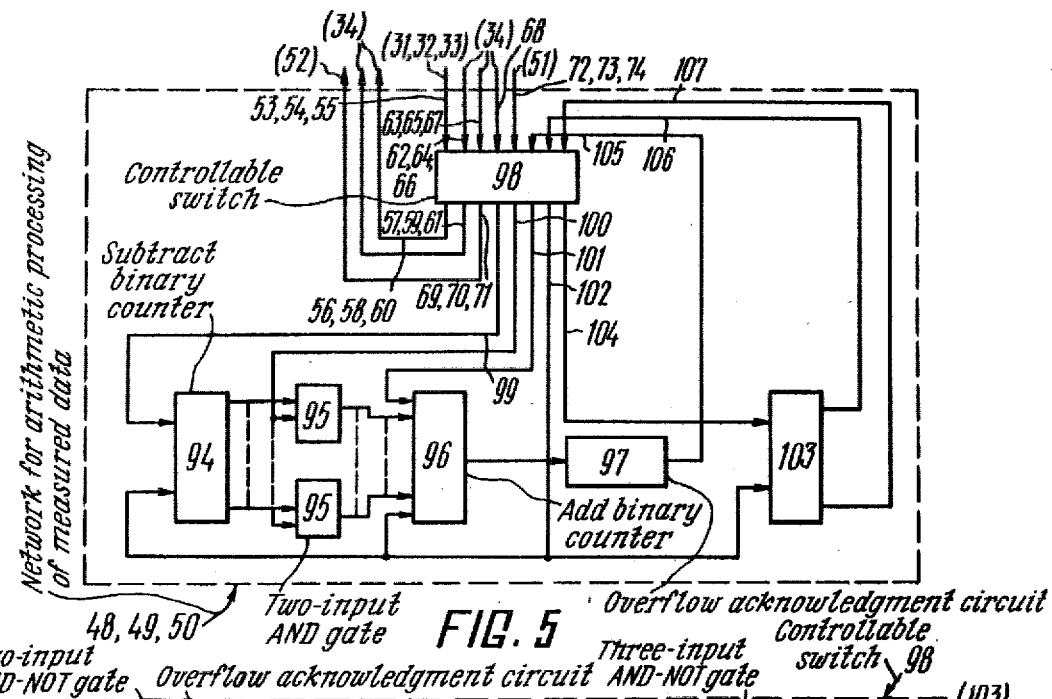
FIG. 5 is a network for arithmetic processing of the measured data, according to the invention.
Figure 6:
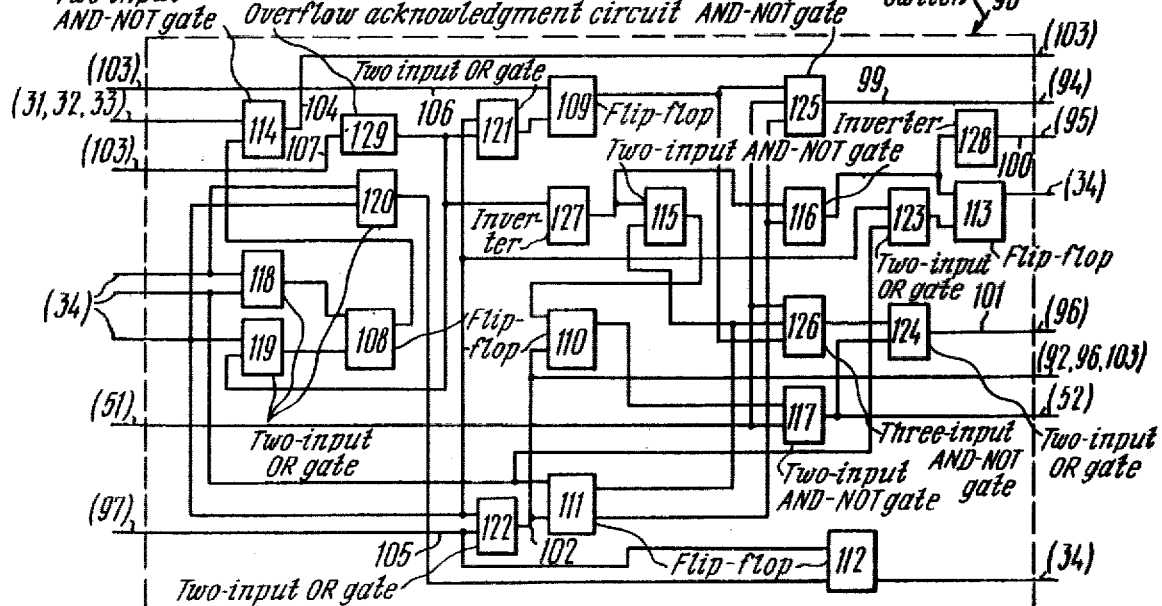
FIG. 6 is a block diagram of a controllable switch, according to the invention.
Figure 7:
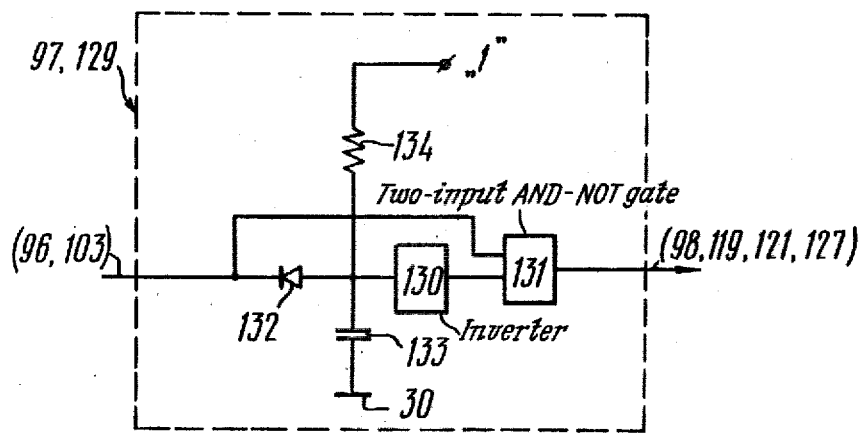
FIG. 7 is a block diagram of an overflow acknowledgment circuit of the arithmetic processing network, according to the invention.

The operation of the networks 48,49,50 (FIG. 3) is described using the network 48 as an example. When a reset pulse is applied, from the output of the control unit 34, to the input 68 of the network 48 via the OR gate 119 (FIG. 6) of the controllable switch 98 of the network 48 (FIG. 5), the flip-flop 108 (FIG. 6) takes on the 0 state. The same pulse passes via the OR gate 120 so that the flip-flop 112 assumes the 0 state. In addition, the same pulse passes through the OR gates 121,123 to bring the flip-flops 109,113 to the 0 state. That pulse also passes through the OR gate 122 to bring the flip-flops 110,111, and also the substract binary counter 94 (FIG. 5), the add binary counter 96, and the add binary counter 103 of the network 48, to the 0 state. The beginning-of-measurement signal applied, from the output of the control unit 34 (FIG. 3), to the input 62 of the network 48 passes through the OR gate 118 (FIG. 6) and brings the flip-flop 108 to the 1 state. Logic 1 from the true output of the flip-flop 108 is applied to a respective input of the AND-NOT gate 114 and the latter is made conducting to pass the pulses from the frequency converter 31 (FIG. 3) which carry data on the weight of the reservoir 1 with the substance and appears at the counting input of the add binary counter 103 (FIG. 5) of the network 48. On the arrival of a first (as counted since the moment at which the AND-NOT gate 114 (FIG. 6) is made conducting) negative edge of a pulse from the output of the frequency converter 31, the complement output of the low-order position of the add binary counter 103 (FIG. 5) produces logic 0 applied to the set input of the flip-flop 109 (FIG. 6), with the result that the latter takes on the 1 state. Logic 1 from the true output of the flip-flop 109 is applied to a respective input of the AND-NOT gate 125 which is thus made conducting. The r.f. pulses from the time-mark generator 51 (FIG. 3) pass through the AND-NOT gate 125 (FIG. 6) to the counting input of the subtract binary counter 94 (FIG. 5). In the case of overflow of the add binary counter 103, the complement output of its high-order position produces logic 1 applied to the input of the overflow acknowledgment circuit 129 (FIG. 6). The output of the circuit 129 then produces a short pulse which passes through the OR gate 121 to cause the flip-flop 129 to assume the 0 state. Logic 0 is applied to the input of the AND-NOT gate 125 and the latter is therefore not conducting. As a result, no r.f. pulses are applied to the counting input of the subtract binary counter 94 (FIG. 5). The number of r.f. pulses applied is given by $$N_1 = n \cdot T_1 f \tag{1}$$

where
n is the number of the bit positions of the add binary counter 103 of the arithmetic processing network 48;

$T_1$ is the repetition rate of the pulses of the frequency converter 31 (FIG. 3), representative of the weight of the reservoir 1 filled with the substance;

f is the frequency of the r.f. pulses of the time-mark generator 51.

The following codeword is placed in the substract binary counter 34 (FIG. 5).

$$K = 2^K - N_1 \tag{2}$$

where K is the number of the bit positions of the subtract binary counter 94.

The pulse from the output of the overflow acknowledgment circuit 129 (FIG. 6) passes through the inverter 127 and through the AND-NOT gate 116 (with the AND-NOT gate 115 not conducting in this case)

and the flip-flop 113 assumes the 1 state. The pulse also passes through the inverter 128 to cause the AND-NOT gates 95 (FIG. 5) to conduct. The codeword contained in the subtract binary counter 94 is placed into the add binary counter 96. At this step, the cycle of measuring the weight of the reservoir 1 (FIG. 3) with the substance is complete.

When the beginning-of-measurement pulse from the output of the control unit 34 is applied to the input 63 of the network 48, it then passes through the OR gate 118 (FIG. 6) and causes the flip-flop 108 to take on the 1 state. The same pulse causes the flip-flop 111 to take on the 1 state and, on passing the OR gate 123, it also causes the flip-flop 113 to take on the 0 state. Logic 1 from the true output of the flip-flop 108 is applied to a respective input of the AND-NOT gate 114 and causes it to conduct. The rectangular pulses from the output of the frequency converter 31 (FIG. 3), carrying data on the weight of the reservoir 1 which is unloaded at the given point in time pass through the AND-NOT gate 114 (FIG. 6) to the counting input of the add binary counter 103 (FIG. 5). On the arrival of a first (as counted since the moment at which the AND-NOT gate 114 (FIG. 6) is made conducting) negative edge of a pulse from the output of the frequency converter 31 (FIG. 3), the complement output of the low-order add binary counter 103 (FIG. 5) produces logic 0. The latter causes the flip-flop 109 (FIG. 6) to take on the 1 state. The r.f. pulses from the output of the time-mark generator 51 (FIG. 3) pass through the AND-NOT gate 126 (FIG. 6), with the AND-NOT gates 125,126 made non-conductive using logic 0 obtained from the complement output of the flip-flop 111, and through the OR gate 124 to the counting input of the add binary counter 96 (FIG. 5). In the case of overflow of the add binary counter 103, the complement output of the high-order position produces logic 1. The output of the overflow acknowledgment circuit 129 (FIG. 6) produces a short pulse which cause the flip-flop 109 to take on the 0 state. That pulse passes through the inverter 127 and the AND-NOT gate 115 and causes the flip-flop 110 to take on the 1 state. The AND-NOT gate 126 is made non-conductive using logic 0 applied to its respective input from the true output of the flip-flop 110. The r.f. pulses pass through the AND-NOT gate 117 and the OR gate 124 from a respective output of the time-mark generator 51 (FIG. 3) to the counting input of the add binary counter 96 (FIG. 5), and are also applied from the output of the AND-NOT gate 117 (FIG. 6) to a respective input of the summation unit 52 (FIG. 3). In the case of overflow of the add binary counter 96 (FIG. 5), the complement output of the high-order position produces logic 1 applied to the input of the overflow acknowledgment circuit 97. The output of the latter produces a short pulse which causes the flip-flop 112 (FIG. 6) to take up the 1 state. That pulse also passes through the OR gate 122, causes the flip-flops 110,111 to take on the 0 state, and causes the subtract binary counter 94 (FIG. 5), the add binary counter 96 and the add binary counter 103 to be reset. At this step, the cycle of measuring the weight of the reservoir 1 (FIG. 3) unloaded, determining the weight of the substance withdrawn from it, and summing the result with data previously stored in the summation unit 52 is complete.

The number of r.f. pulses applied from the output 69 of the network 48 to respective input of the summation unit 52 is given by $$N = N_1 - N_2 \quad (3)$$

where
$N_1$ is the number of r.f. pulses, representative of the weight of the reservoir 1 loaded;
$N_2$ is the number of r.f. pulses, representative of the weight of the reservoir 1 unloaded.

$$N_2 = n \cdot T_2 \cdot f \quad (4)$$

where
n is the number of bit positions of the add binary counter 103 (FIG. 5) of the network 48;
$T_2$ is the repetition rate of the pulses of the frequency converter 31 (FIG. 3), representative of the weight of the reservoir 1 unloaded; and
f is the frequency of r.f. pulses of the time-mark generator.

Thus $$N = N_1 - N_2 = n \cdot T_1 \cdot f - n \cdot T_2 \cdot f = n \cdot f(T_1 - T_2) = K \cdot \Delta T \quad (5)$$

where
$\Delta T$ is the repetition rate difference for the pulses of the frequency converter 31, representative of the weight of the substance withdrawn from the reservoir 1;
K is the coefficient determined by a multiple proportion between the number $N_i$ and the weight of the reservoir 1 with the substance.

The overflow acknowledgment circuits 97 (FIG. 5) of the networks 48,49,50 and the overflow acknowledgment circuits 129 (FIG. 6) of the controllable switches 98 operate in a similar manner described below. When logic 1 is applied to the input of the circuit 97, diode 132 (FIG. 7) is not conducting and the capacitor 133 begins to charge via the resistor 134. Prior to that point in time, the capacitor 133 discharged via the diode 132. During the charge time of the capacitor 133, in which it is given a voltage equal to the operating voltage of the inverter 97, logic 1's are present at the inputs of the AND-NOT gates 131. Logic 0 is present at the AND-NOT gate 131. When the voltage across the capacitor 133 reaches the value of the operating voltage of the inverter 130, the output of the latter produces logic 0. In this case, the output of the AND-NOT gate 137 produces logic 1. Therefore, the appearance of logic 1 at the input of the circuit 97 results in the formation at its output of a short pulse whose length corresponds to the charge time of the capacitor 133 within which it is given a voltage equal to the operating voltage of the flip-flop 130.

Figure 17:
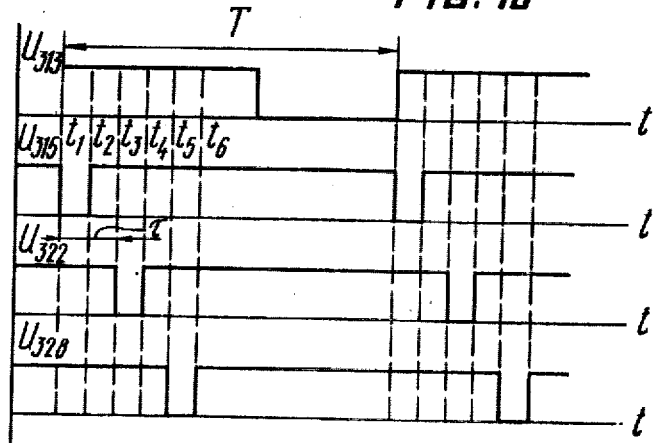
FIG. 17 is a timing diagram illustrating the operation of the time-mark generator, according to the invention.

The time-mark generator 51 (FIG. 3), designed to form three synchronous trains of frequency-stable pulses given a phase shift, operates in the following manner. The appearance at the point in time $t_1$ (FIG. 17) of logic 1 at the cathode of the diode 314, obtainable from the output of the oscillator 313 (FIG. 15), makes the diode 314 non-conductive and the capacitor 317, previously discharged, begins to charge using the input current of the inverter 316. At the output of the latter there appears logic 1, whereas the output of the AND-NOT gate 315 produces logic 0. At the point in time $t_2$ (FIG. 17), the capacitor 317 (FIG. 15) charges to a voltage equal to the operating voltage of the flip-flop 316. The output of the AND-NOT gate 315 produces logic 1 which causes the diodes 319,321 to conduct. The capacitors 320,323, previously discharged through the diodes 319,321, begin to charge. Since the value of the capacitor 320 is twice the value of the capacitor 323 and the latter is selected to be equal to the value of the capacitor 317, the capacitor 323 tends to charge to a voltage equal to the operating voltage of the AND-NOT gate 322, and it does so before the capacitor 320 charges to a voltage equal to the operating voltage of the inverter 318. The AND-NOT gate 322 operates at the point in time $t_3$ (FIG. 17) while the inverter 318 (FIG. 15) operates at the point in time $t_4$ (FIG. 17). According to FIG. 17, the output of the AND-NOT gate 322 (FIG. 15) produces a pulse whose length is equal to the length of the pulse previously formed at the output of the AND-NOT gate 315 (FIG. 15) and time-shifted with respect to the former.

The operation of the inverter 327, AND-NOT gate 328, diodes 324,325, and capacitors 326,329 of the generator 51 is analogous to that described for the inverter 318, AND-NOT gate 322, diodes 319,321 and capacitors 320,323, and is illustrated by the timing diagram of FIG. 17.

Figure 16:
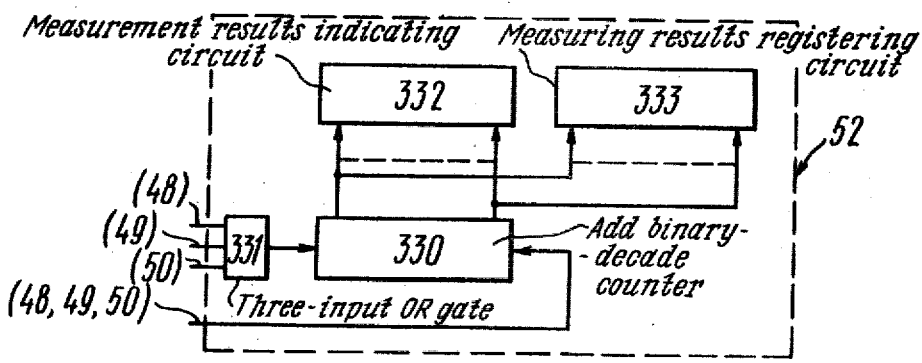
FIG. 16 is a block diagram of a summation unit, according to the invention.

The summation unit 52 (FIG. 3) operates as follows. When a clear pulse from the output of the control unit 34, connected to the inputs 68 of the networks 48,49,50, is applied to the reset inputs of the bit positions of the add binary-decade counter 330 (FIG. 16) the latter is padded with zeros. A clear pulse is produced automatically, when the supply unit 75 (FIG. 3) is energized, or by depressing the button 269 (FIG. 8) of the control unit 34 so as to activate the apparatus. The r.f. pulses from the data outputs 69,70,71 (FIG. 3) of the networks 48,49,50, carrying data on the weight of the substance withdrawn from the given reservoir, are applied to the inputs of the OR gate 331 (FIG. 16). Thereafter, these pulses are applied to the counting input of the counter 330, are stored therein, and are applied in the form of a binary-decade code to the inputs of the decoding/indicating circuit 332 and to the inputs of the registering circuit 333. In the latter, the intermediate results relating to the metering of the amount of the substance, and also those representing the total amount of the substance passed through the apparatus during the entire operational cycle, are placed.

Described below are typical operations performed in the reservoirs 1,2,3 (FIG. 3). First consider the load and unload operations relating, by way of example, to the reservoir 1. When the reservoir loading means 8 (FIG. 4) is opened under the action of a liquid, the latter is led from the inlet collector 14 into the T-piece 84 and then passes into the reservoir 1 via the bellows 82. As the reservoir 1 is filled with the liquid, the level of the latter rises until the float 92, together with the magnet 93 mounted thereon, reaches the preset upper range 25. The magnet 93 acts on the magnet-controlled contact of the signalling means 22 at the lower limit of the preset upper range 25, and the means 22 therefore operates. As a result, the reservoir loading means 8 is closed and the flow of the liquid to the reservoir 1 is stopped. If the liquid level, during the above operations, reaches the upper limit of the preset upper range 25, the signalling means 22 operates again, as the magnet 93 acts on the other magnet-controlled contact of the means 22, arranged at the upper limit. The magnet-controlled contacts of the signalling means 22,26 of respective preset ranges 25,29, upper and lower, are connected in parallel. When the liquid level and, therefore, the float 92 are located in the middle of the preset range, the magnet-controlled contacts of respective signalling means are opened.

When the reservoir unload means 11 is opened, the liquid is led out of the reservoir 1. The liquid level lessens and the liquid passes through the bellows 82 and the T-piece 84 into the outlet collector 15. When the float 92, together with the magnet 93, reaches the preset lower range 29, the signalling means 26 operates. Thus, the means 11 is closed and the flow of the liquid from the reservoir 1 is stopped. If the liquid level reaches the lower limit of the preset lower range 29, the signalling means 26 operates again.

The compensation of the hydrostatic components of the weight of the liquid during loading and unloading the reservoirs with the liquid delivered from under its surface is as follows. The reservoir 1 being weighed is loaded, and the liquid is withdrawn via the bellows 82 at its bottom portion. The column of the liquid within the cross-section of the bellows 82 rests on the lower wall of the immovable T-piece 84 and is not taken into account in weighing the reservoir 1 with the liquid. As a result, the amount of the liquid in the reservoir 1 actually weighed is less that the amount of the withdrawn liquid, the difference being equal to the weight of the column of the liquid, whose cross-section amounts to the section of the bellows 82. The compensation of that column not included in the weighing result is carried out by virtue of the rod 90 rigidly fixed to the body 7 and having its cross-section equal to that of the bellow 82. The rod 90 is responsible for an additional force created in the reservoir 1 with the liquid and applied to the dynamometric pickup 4, with the result that the weight of the column of the liquid not included in the weighing result is compensated for at any level of the liquid within the limits of the preset upper and lower ranges 25,29.

The method and apparatus of the invention make it possible to accurately determine the amount of a substance passed, for example, through product lines, in the form of a continuous flow. The above techniques of the method of the invention have a minimal influence on the inlet flow of the substance, and provide for the formation of a continuous flow of the substance, which is necessary for normal operation of a given product line. The method utilizes a technique according to which the beginning of weight measurement, following the load or unload operation, is delayed, with the result that more accurate weight determination of the amount of the substance is attained, with the production rate of the basic process dealing with the transportation of the substance maintained at higher level, thereby ensuring greater economic effect as compared to conventional methods of determining the amount of the substance in which ordinary weighing means such as scales are used.

What is claimed is:

1. A method of weight determination of the amount of a substance possessing fluidity quality, carried out in a continuous flow of the substance passing through a number of reservoirs, comprising the steps as follows;
periodically loading each of said reservoirs with said substance;
terminating said loading within a preset upper range determined by a least one of the characteristics including the volume and weight of the substance and load time, loading of each of said number of reservoirs being terminated not earlier than a time of initiation of loading of one of the remaining reservoirs of said number of reservoirs;
weighing each of said loaded reservoirs for said preset upper range after a time interval corresponding to the setup time for the reservoir with the substance;

periodically unloading each of the reservoirs of said number of reservoirs;

terminating said unloading within a preset lower range determined by at least one of the characteristics including the volume and weight of the substance and unload time, unloading of each of said number of reservoirs being terminated not earlier than a time of initiation of unloading of one of the remaining reservoirs of said number of reservoirs;

weighing each of said reservoirs for said preset lower range after a time interval corresponding to the setup time for the reservoir with the substance; and determining the total amount of the substance by processing the results obtained during said weighing operations for said preset upper and lower ranges.

2. A method as claimed in claim 1, wherein said substance is a liquid, said method further comprising the step of damping said liquid in each of said reservoirs.

3. A method as claimed in claim 2, further comprising the steps of compensating the hydrostatic components of the weight of said liquid during the loading and unloading of the reservoirs, damping of the liquid in them, and weighing of the reservoirs.

4. An apparatus for weight determination of the amount of a substance possessing fluidity quality, carried out in a continuous flow of the substance, comprising:

a number of reservoirs, each having an upper end face member and a lower end face member;

feeding means, equal in number to the reservoirs and connected with respective ones of the reservoirs, for feeding the substance into the reservoirs;

withdrawing means, equal in number to the reservoirs and connected with respective ones of the reservoirs, for withdrawing the substance from the reservoirs;

reservoir loading means, equal in number to the reservoirs, and each having a first input and a second input, and each being associated kinematically with a respective one of said feeding means, for loading the substance fed by said feeding means into the reservoirs;

reservoir unloading means, equal in number to the reservoirs, and each having a first input and a second input, and being associated kinematically with a respective one of said withdrawing means, for unloading the substance withdrawn from the reservoirs by said withdrawing means;

dynamometric pickups, equal in number to the reservoirs, and each having an output and being associated with a respective one of said reservoirs;

a body mounting said dynamometric pickups;

frequency converters, equal in number to said reservoirs, and each having a first input, a second input, a third input, and an output, and each having its first input coupled to said output of a respective one of said pickups;

first indicating means for indicating the amount of the substance fed into the reservoirs, and having an output, said first indicating means being implemented in the form of a signalling device for a preset upper range;

second indicating means for indicating the amount of the substance withdrawn from the reservoirs, and having an output, said second indicating means being implemented in the form of a signalling device for a preset lower range;

a control unit having a first input, a first group of inputs equal in number to the number of reservoirs, a second group of inputs equal in number to the number of reservoirs, a third group of inputs equal in number to double the number of the reservoirs, a first output, a first group of outputs equal in number to the number of reservoirs, a second group of outputs equal in number to the number of reservoirs, a third group of outputs equal in number to double the number of reservoirs, said control unit having the inputs of said first group of inputs coupled to the outputs of said first indicating means, having the inputs of said second group of inputs coupled to the outputs of said second indicating means, having the outputs of said first group of outputs coupled to the inputs of the reservoir loading means, and having the outputs of said second group of outputs coupled to the inputs of the reservoir unloading means;

a unit for measuring and registering the amount of the substance, having a first input, a second input, a first group of inputs equal in number to the number of reservoirs, a second group of inputs equal in number to double the number of reservoirs, said unit having said first input coupled to said first output of said control unit, having said inputs of said first group of inputs coupled to said outputs of said frequency converters, having sadi inputs of said second group of inputs coupled to the outputs of said third group of outputs of said control unit, and having the outputs of said group of outputs coupled to the inputs of said third group of inputs of said control unit; and arithmetic processing networks for arithmetically processing measured data, for determining the weight of said reservoirs with the substance, and also for determining the weighing results relating to the loaded and unloaded reservoirs, said arithmetic processing networks being equal in number to the number of reservoirs, and having first data inputs adapted to constitute said first group of inputs of said unit for measuring and registering the amount of the substance, having second and third trigger inputs adapted to constitute said second group of inputs of said unit for measuring and registering the amount of the substance, having fourth reset inputs joined together and adapted to constitute said first input of said unit for measuring and registering the amount of the substance, having fifth time-mark inputs, having sixth inputs joined together and adapted to constitute said second input of said unit for measuring and registering the amount of the substance, having first and second control inputs adapted to constitute said group of outputs of said unit for measuring and registering the amount of the substance, and having third data outputs;

said unit for measuring and registering the amount of the substance further comprising a summation unit having a first input, and a group of inputs equal in number to the number of reservoirs, said summation unit having said second input coupled to said sixth inputs of said arithmetic processing networks, having said first input coupled to said fourth inputs of said arithmetic processing networks, having the inputs of said group of inputs coupled to said third data outputs of said arithmetic processing networks, said unit for measuring and registering the amount of the substance further comprising a time-mark generator having an input and a group of outputs equal in number to the number of reservoirs, said time-mark generator having said group of outputs coupled to said fifth time-mark input of said arithmetic processing networks;

said apparatus further comprising a supply unit having a number of outputs coupled to said second inputs of said reservoir loading means and said reservoir unloading means, to said third inputs of said frequency converters, to said first input of said control unit, and to said second input of said unit for measuring and registering the amount of the substance.

5. An apparatus as claimed in claim 4, wherein said feeding means is implemented, for each of said reservoirs, in the form of a first bellows mounted on the outside of said each of said reservoirs on said lower end face member thereof.

6. An apparatus as claimed in claim 5, wherein each of said reservoirs comprises a hermetically sealed reservoir, each of said reservoirs having a second bellows mounted on the outside of said each of said reservoirs on said upper end face member thereof in coaxial relation to said first bellows, and having its cross-section equal to that of the first bellows, and adapted to pass the volatile components of the liquid.

7. An apparatus as claimed in claim 6, further comprising:
means for damping the liquid resting on the surface of the liquid in each of the reservoirs.

8. An apparatus as claimed in claim 7, wherein said means for damping comprises a plate having an area less than that of the cross-section of the reservoir and having an off-center hole, and a guide rod affixed in a vertical position in said upper and lower end face members of the reservoir and positioned in said off-center hole of said plate.

9. An apparatus as claimed in claim 8, further comprising:
rod means for compensating for the hydrostatic components of the weight of the liquid, positioned vertically along the axis of symmetry of each of the reservoirs, and having a length exceeding the distance between the preset upper and lower ranges, and having, over the entire length, a cross-section equal to that of said first bellows.

10. An apparatus as claimed in claim 7, further comprising:
rod means for compensating for the hydrostatic components of the weight of the liquid, positioned vertically along the axis of symmetry of each of the reservoirs, and having a length exceeding the distance between the preset upper and lower ranges, and having, over the entire length, a cross-section equal to that of said first bellows.

11. An apparatus as claimed in claim 5, further comprising:
means for damping the liquid resting on the surface of the liquid in each of said reservoirs;

12. An apparatus as claimed in claim 11, wherein said means for damping comprises a plate having an area less than that of the cross-section of the reservoir and having an off-center hole, and a guide rod affixed in a vertical position in said upper and lower end face members of the reservoir and positioned in said off-center hole of said plate.

13. An apparatus as claimed in claim 12, further comprising:
rod means for compensating for the hydrostatic components of the weight of the liquid, positioned vertically along the axis of symmetry of each of the reservoirs, and having a length exceeding the distance between the preset upper and lower ranges, and having, over the entire length, a cross-section equal to that of said first bellows.

14. An apparatus as claimed in claim 11, further comprising:
rod means for compensating for the hydrostatic components of the weight of the liquid, positioned vertically along the axis of symmetry of each of the reservoirs, and having a length exceeding the distance between the preset upper and lower ranges, and having, over the entire length, a cross-section equal to that of said first bellows.

15. An apparatus as claimed in claim 4, wherein each of said arithmetic processing networks comprises:
a subtract binary counter having a first counting input, a second reset input and a number of outputs corresponding to the bit positions of the counter;
a group of AND gates equal in number to the bit positions of the subtract binary counter, each AND gate of said group of AND gates having a first input, a second input, and an output, and having said first input coupled to a respective output of said subtract binary counter;
a first add binary counter having a first counting input, a second reset input, a number of set inputs corresponding to the AND gates, and a complement output of a high-order position, said first add binary counter having said set inputs coupled to said outputs of said AND gates;
an overflow acknowledgment circuit having an input and an output, and having said input coupled to said complement output of said high-order positon of said first add binary counter;
a controllable switch having a first input comprising said first data input of said arithmetic processing network, a second input comprising said second trigger input of said arithmetic processing network, a third input comprising said third trigger input of said arithmetic processing network, a fourth input comprising said fourth reset input of said arithmetic processing network, a fifth input comprising said fifth time-mark input of said arithmetic processing network, a sixth input, a seventh input, an eighth input, a first output comprising said first control output of said data processing network, a second output comprising said second control output of said arithmetic processing network, a third output comprising said third data output of said arithmetic processing network, a fourth output, a fifth output, a sixth output, a seventh output, and an eighth output, said controllable switch having said sixth input coupled to said output of said overflow acknowledgment circuit, having said fourth output coupled to said first counting input of said subtract binary counter, having said fifth output coupled to said second inputs of said AND gates, having said sixth output coupled to said first counting input of said add binary counter, and having said seventh output coupled to said second reset inputs of said subtract binary counter and said first add binary counter; and a second add binary counter having a first counting input and a second reset input, said second add binary counter having said first counting input coupled to said eighth output of said controllable switch, having said second reset input coupled to said seventh output of said controllable switch, having first and second complement outputs of respective low- and high-order positions coupled to said seventh and eighth inputs of said controllable switch.

* * * * *